(12) United States Patent
Kawazoe et al.

(10) Patent No.: US 10,578,372 B2
(45) Date of Patent: Mar. 3, 2020

(54) HEAT RESERVOIR COMPRISING POROUS SUBSTRATE IMPREGNATED WITH LATENT HEAT STORAGE MATERIAL AND METHOD FOR PRODUCING THE SAME

(71) Applicant: EIDAI CO., LTD., Osaka-shi (JP)

(72) Inventors: Masanobu Kawazoe, Osaka (JP); Jiro Nishio, Osaka (JP)

(73) Assignee: EIDAI CO., LTD., Osaka-shi (JP)

( * ) Notice: Subject to any disclaimer, the term of this patent is extended or adjusted under 35 U.S.C. 154(b) by 293 days.

(21) Appl. No.: 15/310,911

(22) PCT Filed: May 15, 2015

(86) PCT No.: PCT/JP2015/064046
§ 371 (c)(1),
(2) Date: Nov. 14, 2016

(87) PCT Pub. No.: WO2015/174523
PCT Pub. Date: Nov. 19, 2015

(65) Prior Publication Data
US 2017/0089646 A1   Mar. 30, 2017

(30) Foreign Application Priority Data

May 16, 2014   (JP) ................... 2014-102526

(51) Int. Cl.
*F28D 20/02*   (2006.01)
*C09K 5/06*    (2006.01)
*F28D 20/00*   (2006.01)

(52) U.S. Cl.
CPC ............. *F28D 20/023* (2013.01); *C09K 5/063* (2013.01); *F28D 2020/0017* (2013.01); *Y02E 60/145* (2013.01)

(58) Field of Classification Search
CPC ..................... F28D 20/023; C09K 5/063
(Continued)

(56) References Cited

U.S. PATENT DOCUMENTS 3,906,137 A * 9/1975 Bauer ................. B29C 44/5654
156/196
5,605,936 A * 2/1997 DeNicola, Jr. ............ C08F 8/48
521/134

(Continued)

FOREIGN PATENT DOCUMENTS

EP   0 344 014 A2   11/1989
EP   2 518 126 A1   10/2012
(Continued)

OTHER PUBLICATIONS

Publication entitled "Experimental Study on the Influence of Foam Porosity and Pore Size", Khalid Lafdi (Year: 2007).*
(Continued)

*Primary Examiner* — Paul Alvare
(74) *Attorney, Agent, or Firm* — Oblon, McClelland, Maier & Neustadt, L.L.P.

(57) ABSTRACT

An object of the present invention is to prevent efflux of a heat storage material composition from a porous substrate in a heat reservoir. The heat reservoir of the present invention is characterized in that a porous substrate is impregnated with a latent heat storage material and a hydrogenated styrene-based thermoplastic elastomer. When the weight-average molecular weight of the elastomer is designated as $X \times 10^4$ and the amount of the elastomer is designated as Y parts by mass relative to 100 parts by mass of the latent heat storage material in the heat storage material composition, the following conditions are satisfied: $5 \leq X \leq 17$; $5 \leq Y \leq 25$; if $5 \leq X < 10$, $Y \geq -2X+25$; and if $14 < X \leq 17$, $Y \leq -5X+90$.

14 Claims, 13 Drawing Sheets

(58) Field of Classification Search
USPC .......................................................... 165/10
See application file for complete search history.

(56) References Cited

U.S. PATENT DOCUMENTS

| | | | | |
|---|---|---|---|---|
| 5,718,835 | A * | 2/1998 | Momose | C09K 5/063 |
| | | | | 106/271 |
| 5,834,559 | A * | 11/1998 | Deguchi | C08L 23/10 |
| | | | | 525/93 |
| 6,048,933 | A * | 4/2000 | Tasaka | C08L 53/02 |
| | | | | 524/269 |
| 2011/0193008 | A1 | 8/2011 | Fieback et al. | |
| 2015/0291868 | A1 * | 10/2015 | Rajagopalan | C09K 5/14 |
| | | | | 442/59 |

FOREIGN PATENT DOCUMENTS

| | | |
|---|---|---|
| EP | 2 915 860 A1 | 9/2015 |
| JP | 62-187782 A | 8/1987 |
| JP | 63-75083 A | 4/1988 |
| JP | 1-135890 A | 5/1989 |
| JP | 4-85387 A | 3/1992 |
| JP | 5-1281 A | 1/1993 |
| JP | 6-17041 A | 1/1994 |
| JP | 6-238622 | 8/1994 |
| JP | 2528714 B2 | 8/1996 |
| JP | 2002-105442 A | 4/2002 |
| JP | 2003-155789 A | 5/2003 |
| JP | 2006-123447 | 5/2006 |
| JP | 2006-225986 A | 8/2006 |
| JP | 2008-031743 | 2/2008 |
| JP | 2010-253818 A | 11/2010 |
| JP | 2015-19750 A | 2/2015 |
| WO | 87/03290 A1 | 6/1987 |
| WO | WO 2014/069297 A1 | 5/2014 |

OTHER PUBLICATIONS

International Search Report dated Jul. 21, 2015 in PCT/JP2015/064046 filed May 15, 2015.
Extended European Search Report dated Jan. 4, 2018 in Patent Application No. 15793392.0.
Office Acton dated Aug. 13, 2019, in Japan patent Application No. 2016-519316.

* cited by examiner

Fig. 2-1
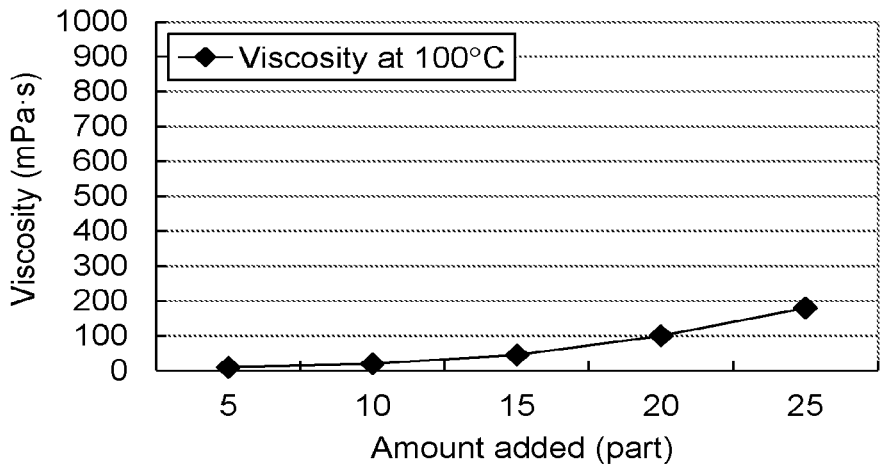
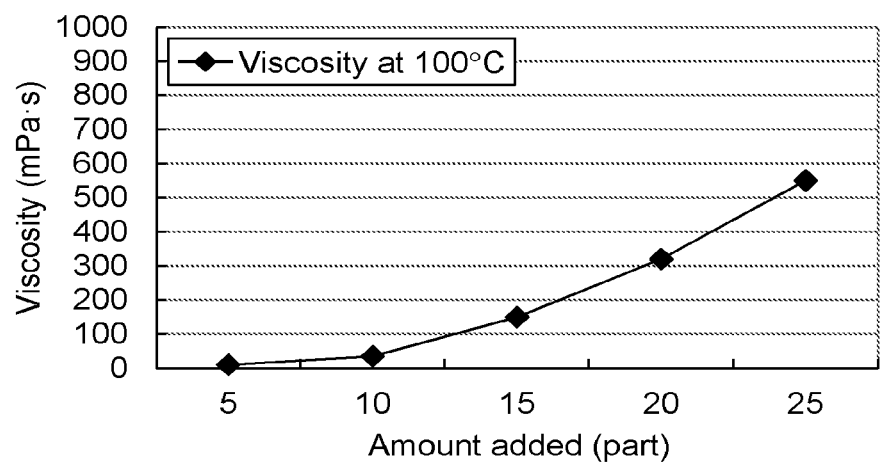
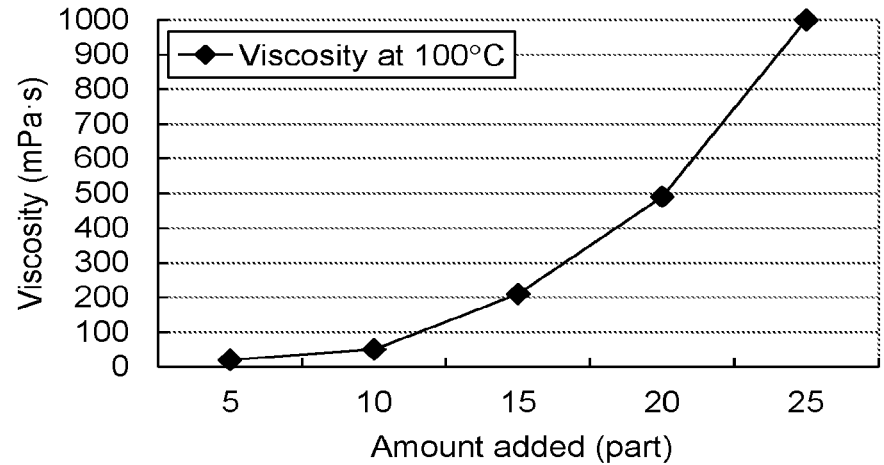

Fig. 3-1
A
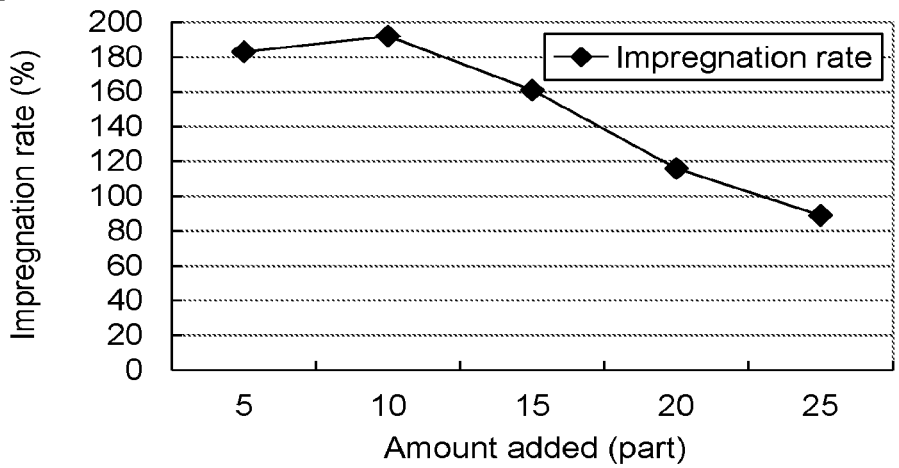
B
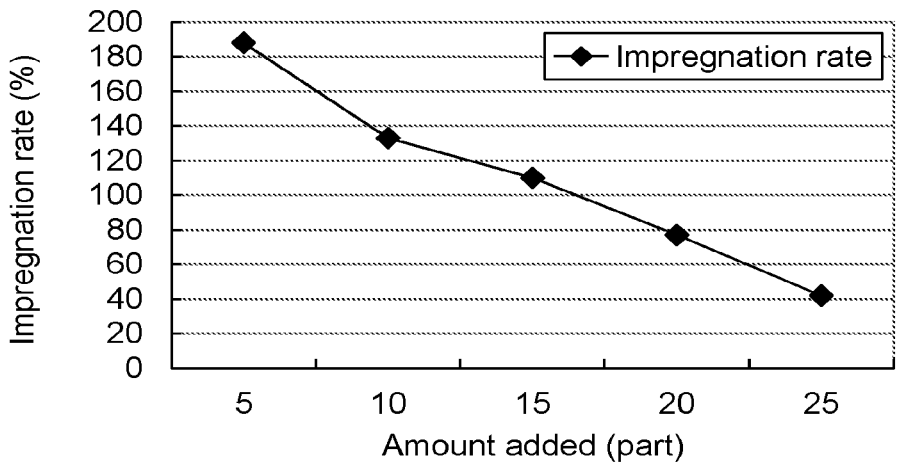
C
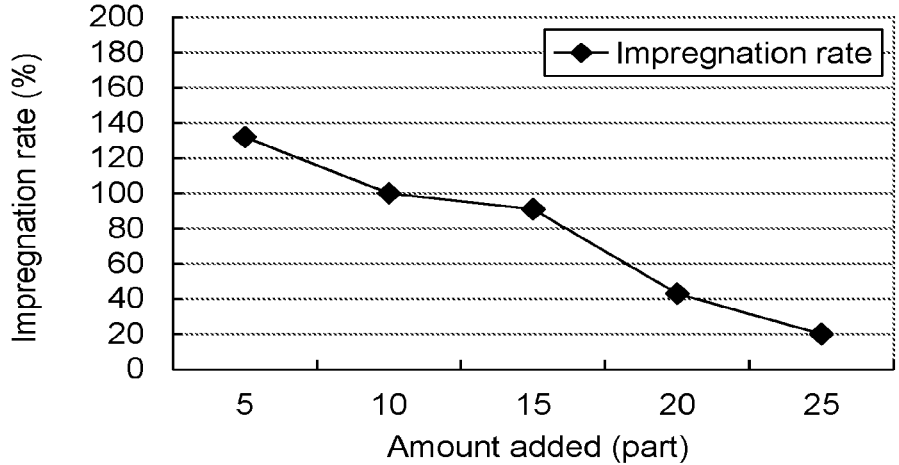

○: Both impregnation performance and exudation resistance are evaluated as ○.
△: Either impregnation performance or exudation resistance is evaluated as ○ while the other variable is evaluated as △, or both thereof are evaluated as △.
×: Either or both impregnation performance and/or exudation resistance is/are evaluated as ×.

HEAT RESERVOIR COMPRISING POROUS SUBSTRATE IMPREGNATED WITH LATENT HEAT STORAGE MATERIAL AND METHOD FOR PRODUCING THE SAME

TECHNICAL FIELD

The present invention relates to a heat reservoir that can be used for various applications, such as building materials, and a method for producing the same.

BACKGROUND ART

Recent housing, of which so-called "smart houses" are representative, is being built with the aim of achieving comfort without carbon dioxide emissions under keywords such as "energy saving," "energy creation," and "energy storage." Meanwhile, the concept of the "passive house" exists. In relation thereto, the building of housing with high heat insulation performance for extensive energy saving and comfort has been gaining attention. In any housing, it is indispensable to improve performance in the areas of heat insulation and thermal environment. Against such background, research and development of building materials that allow heat to be stored via the floors and walls of housing so as to provide a comfortable living space while saving energy have been gaining momentum.

For example, there have been proposals and attempts to store the natural energy of sunlight or the like, thermal energy generated by heating and cooling equipment or the like, heat energy generated in daily living, and the like in latent heat storage material that can realize heat absorption or dissipation depending on changes in exterior air temperature, so as to minimize interior temperature change.

For example, Patent Literature 1 to 6 disclose technology combining building materials with latent heat storage material for imparting heat storage ability to building materials. Patent Literature 1 discloses a technology of dispersing microcapsules encapsulating a latent heat storage material in solid media such as cellulose fibers. Patent Literature 2 discloses a technology of allowing a board comprising a kenaf core to absorb a latent heat storage material. Patent Literature 3 discloses a technology of incorporating a latent heat storage material into a matrix comprising an inorganic cement material. Patent Literature 4 discloses a technology of dispersing pellets containing a latent heat storage material within a substrate such as plaster, concrete, or the like. Patent Literature 5 discloses a technology of laminating a heat storage sheet impregnated or coated with microcapsules encapsulating a latent heat storage material on an interior face or another face of plasterboard. Patent Literature 6 discloses plasterboard made of a porous material or the like that is impregnated with a molten mixture comprising an ethylene-α-olefin copolymer having given densities and a heat storage material.

Using latent heat storage materials means using the latent heat required for phase transition between the solid phase and the liquid phase. When using the materials, liquid efflux can sometimes cause problems. If a porous substrate is impregnated merely with a latent heat storage material, as in the case of Patent Literature 2, it is impossible to avoid the exudation (that is, efflux) of the latent heat storage material from the porous substrate at temperatures equaling or exceeding the melting point of the latent heat storage material. In view of this, Patent Literature 4 discloses that the pellets are formed by dispersing the latent heat storage material within the polyolefin matrix, thereby reducing exudation of the latent heat storage material during melting. Also, Patent Literature 6 discloses that addition of an ethylene-α-olefin copolymer having a given density reduces exudation of the latent heat storage material. However, the conventional technology for preventing exudation of a latent heat storage material from a porous substrate is not sufficient. Accordingly, there is a demand to further improve such technology.

Patent Literatures 7 to 11 disclose the technology of preventing latent heat storage material exudation by combining a latent heat storage material, such as paraffin, with a polymer compound. However, Patent Literature 7 to 11 do not suggest using the latent heat storage material composition to impregnate porous substrates, such as a wooden building material. These literatures only teach using the composition by itself as a heat reservoir. Such heat storage material composition has a high viscosity upon melting, thus not allowing a porous substrate to be impregnated therewith. This has been problematic.

CITATION LIST

Patent Literature

Patent Literature 1: JP Patent Publication (Kokai) No. 2003-155789 A
Patent Literature 2: JP Patent Publication (Kokai) No. 2010-253818 A
Patent Literature 3: JP Patent Publication (Kokai) No. S63-75083 A (1988)
Patent Literature 4: JP Patent Publication (Kokai) No. H1-135890 A (1989)
Patent Literature 5: JP Patent Publication (Kokai) No. 2006-225986 A
Patent Literature 6: JP Patent Publication (Kokai) No. H5-1281 A (1993)
Patent Literature 7: JP Patent Publication (Kokai) No. S62-187782 A (1987)
Patent Literature 8: JP Patent Publication (Kokai) No. H4-85387 A (1992)
Patent Literature 9: JP Patent Publication (Kokai) No. 2002-105442 A
Patent Literature 10: US2011/0193008A1
Patent Literature 11: JP Patent No. 2528714

SUMMARY OF INVENTION

Technical Problem

An object of the present invention is to prevent efflux of a latent heat storage material from a porous substrate in a heat reservoir comprising a porous substrate and a latent heat storage material with which the porous substrate is impregnated.

Solution to Problem

The present inventors have found that a heat reservoir comprising a porous substrate and a latent heat storage material composition with which such porous substrate is impregnated, wherein the composition comprises a latent heat storage material to which a certain amount of a hydrogenated styrene-based thermoplastic elastomer having a specific weight-average molecular weight has been added, can prevent efflux of the latent heat storage material from the porous substrate. This has led to the completion of the present invention.

Specifically, the heat reservoir of the present invention is characterized in that it comprises at least a porous substrate and a heat storage material composition with which the porous substrate is impregnated, wherein the heat storage material composition contains a latent heat storage material and a hydrogenated styrene-based thermoplastic elastomer and wherein, when the weight-average molecular weight of the hydrogenated styrene-based thermoplastic elastomer is designated as $X \times 10^4$ and the amount of the hydrogenated styrene-based thermoplastic elastomer is designated as Y parts by mass relative to 100 parts by mass of the latent heat storage material in the heat storage material composition, the following conditions are satisfied: $5 \leq X \leq 17$; $5 \leq Y \leq 25$; if $5 \leq X < 10$, $Y \leq -2X+25$; and if $14 < X \leq 17$, $Y \leq -5X+90$. Such conditions are collectively referred to as "condition (1)" in some cases.

According to the present invention, efflux of a latent heat storage material and a heat storage material composition containing the latent heat storage material from a porous substrate can be prevented. In addition, the viscosity of the heat storage material composition is sufficiently low so that the porous substrate can be impregnated with such heat storage material composition.

In preferred embodiments of the present invention, the heat storage material composition is a composition that melts to form a liquid having a viscosity of 500 mPa·s or less at 100° C. when the viscosity is measured by a B-type viscometer. Thus, the porous substrate can be readily impregnated with such heat storage material composition.

In another embodiment of the present invention, X satisfying the above condition is further limited to 7.5 to 15. This embodiment can more effectively prevent efflux of the latent heat storage material and the heat storage material composition containing the latent heat storage material from the porous substrate. In addition, the viscosity of the heat storage material composition upon melting is sufficiently low so as to facilitate impregnation of the porous substrate with such heat storage material composition. This is highly advantageous.

In another embodiment of the present invention, the following conditions are satisfied: if $5 \leq X < 10$, $Y \geq -2X+30$ and $Y \leq -X+30$; if $10 \leq X < 14$, $Y \geq -(5/7)X+(120/7)$ and $Y \leq -1.25X+32.5$; and if $14 \leq X \leq 17$, $Y \geq -(5/7)X+(120/7)$ and $Y \leq -(10/3)X+(185/3)$. Such conditions are collectively referred to as "condition (2)" in some cases. This embodiment also can more effectively prevent efflux of the latent heat storage material and the heat storage material composition containing the latent heat storage material from the porous substrate. In addition, viscosity of the heat storage material composition upon melting is sufficiently low so as to facilitate impregnation of the porous substrate with such heat storage material composition. This is highly advantageous.

In another embodiment of the present invention, the porous substrate is a porous substrate having a surface that has a plurality of open holes formed thereon. In such embodiment, the porous substrate is more easily impregnated with the heat storage material composition, which is preferable.

According to the present invention, a method for producing a heat reservoir having the above features, comprising an impregnation step of impregnating the porous substrate with the heat storage material composition that melts to form a liquid so that the heat storage material composition permeates the porous substrate is also disclosed. The viscosity of the heat storage material composition upon melting is sufficiently low so that the heat storage material composition can readily permeate pores of the porous substrate. Therefore, the method for producing the heat reservoir of the present invention can easily produce a heat reservoir in which efflux of a heat storage material composition from a porous substrate.

According to the present invention, a building material comprising or consisting of the heat reservoir of the present invention is provided. Further, according to the present invention, the use of the heat reservoir of the present invention for or as a building material is provided.

This description includes part or all of the content as disclosed in the description and/or drawings of Japanese Patent Application No. 2014-102526, which is a priority document of the present application.

Advantageous Effects of Invention

According to the present invention, in a heat reservoir comprising a porous substrate and a latent heat storage material with which the porous substrate is impregnated, using, as the latent heat storage material, a heat storage material composition comprising a latent heat storage material and a hydrogenated styrene-based thermoplastic elastomer can prevent efflux of the latent heat storage material and the heat storage material composition comprising the latent heat storage material from the porous substrate.

BRIEF DESCRIPTION OF DRAWINGS

FIG. 2-1 shows graphs each indicating changes in viscosity at different molecular weights and amounts of the fixing agent added, which were confirmed in Test 3. Graph A shows the relationship between the viscosity and amount of the added fixing agent having a weight-average molecular weight of 50,000. Graph B shows the relationship between the viscosity and amount of the added fixing agent having a weight-average molecular weight of 100,000. Graph C shows the relationship between the viscosity and amount of the added fixing agent having a weight-average molecular weight of 140,000.

FIG. 2-2 is continued from FIG. 2-1. Graph D shows the relationship between the viscosity and amount of the added fixing agent having a weight-average molecular weight of 170,000. Graph E shows the relationship between the viscosity and amount of the added fixing agent having a weight-average molecular weight of 210,000.

FIG. 3-1 shows graphs each indicating changes in the board impregnation rate when the molecular weight and amount of the added fixing agent have been changed. Graph A shows the relationship between the impregnation rate and amount of the added fixing agent having a weight-average molecular weight of 50,000. Graph B shows the relationship between the impregnation rate and amount of the added fixing agent having a weight-average molecular weight of 100,000. Graph C shows the relationship between the impregnation rate and amount of the added fixing agent having a weight-average molecular weight of 140,000.

FIG. 3-2 is continued from FIG. 3-1. Graph D shows the relationship between the impregnation rate and amount of the added fixing agent having a weight-average molecular weight of 170,000. Graph E shows the relationship between the impregnation rate and amount of the added fixing agent having a weight-average molecular weight of 210,000.

of evaluation of the effects of the molecular weight and amount of the added fixing agent on the board impregnation performance and exudation resistance, which were confirmed in Test 3.

Figure 5:
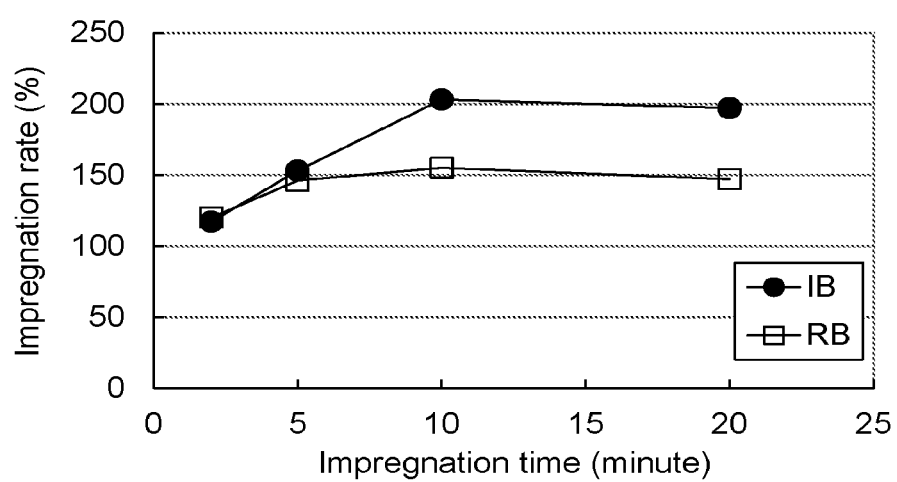

FIG. 5 shows a graph indicating the relationship between impregnation time and impregnation rate for an insulation board (IB) and a rock wool board (RB) impregnated with the latent heat storage material mixture, which was confirmed in Test 5.

Figure 6:
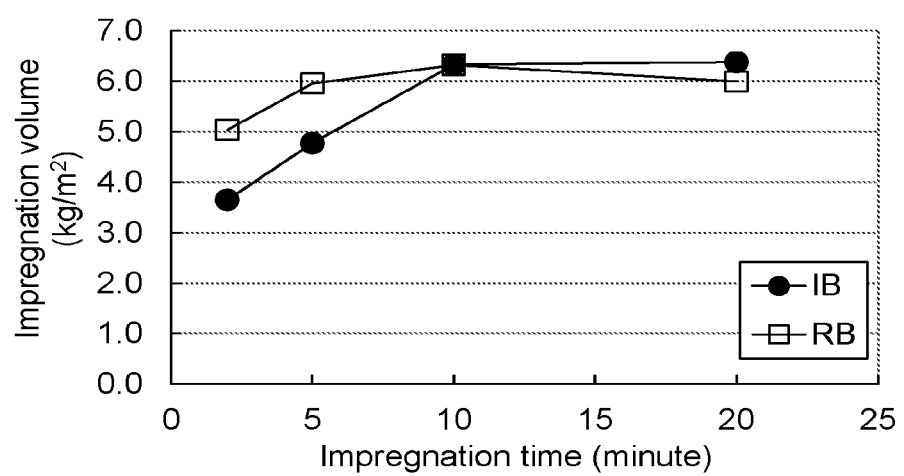

FIG. 6 shows a graph indicating the relationship between impregnation time and impregnation rate for an insulation board (IB) and a rock wool board (RB) impregnated with the latent heat storage material mixture, which was confirmed in Test 5.

Figure 7:
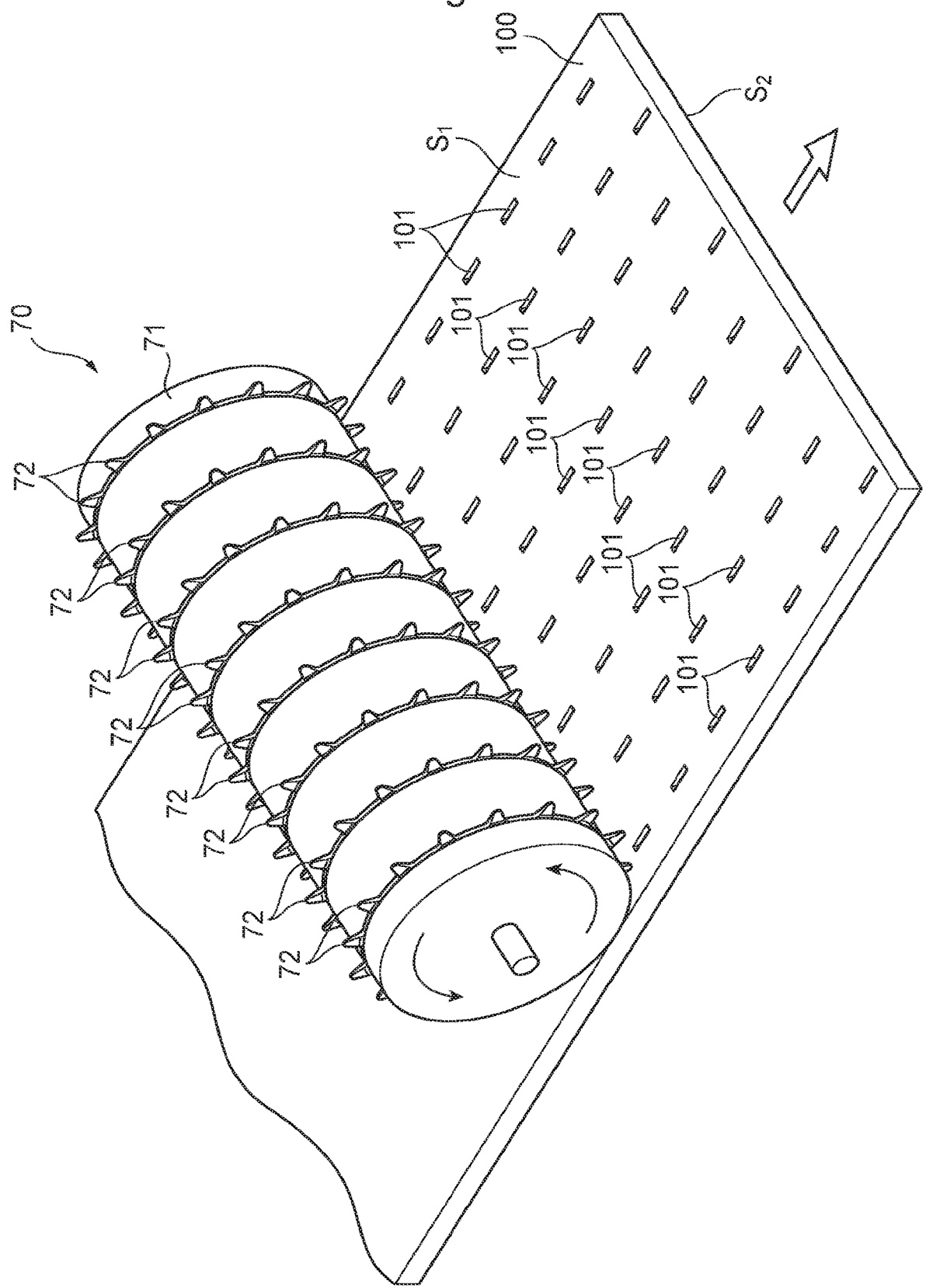

FIG. 7 schematically shows the step of forming a plurality of holes 101 by incising of a porous substrate 100 using an incising cutter 70.

Figure 1:
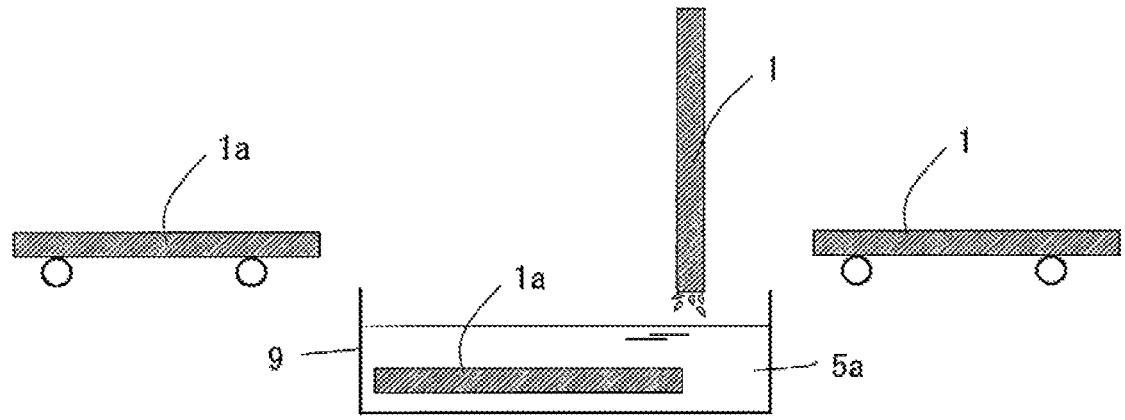
FIG. 1 schematically shows the method for producing the heat reservoir of the present invention.
Figures 1, 8:
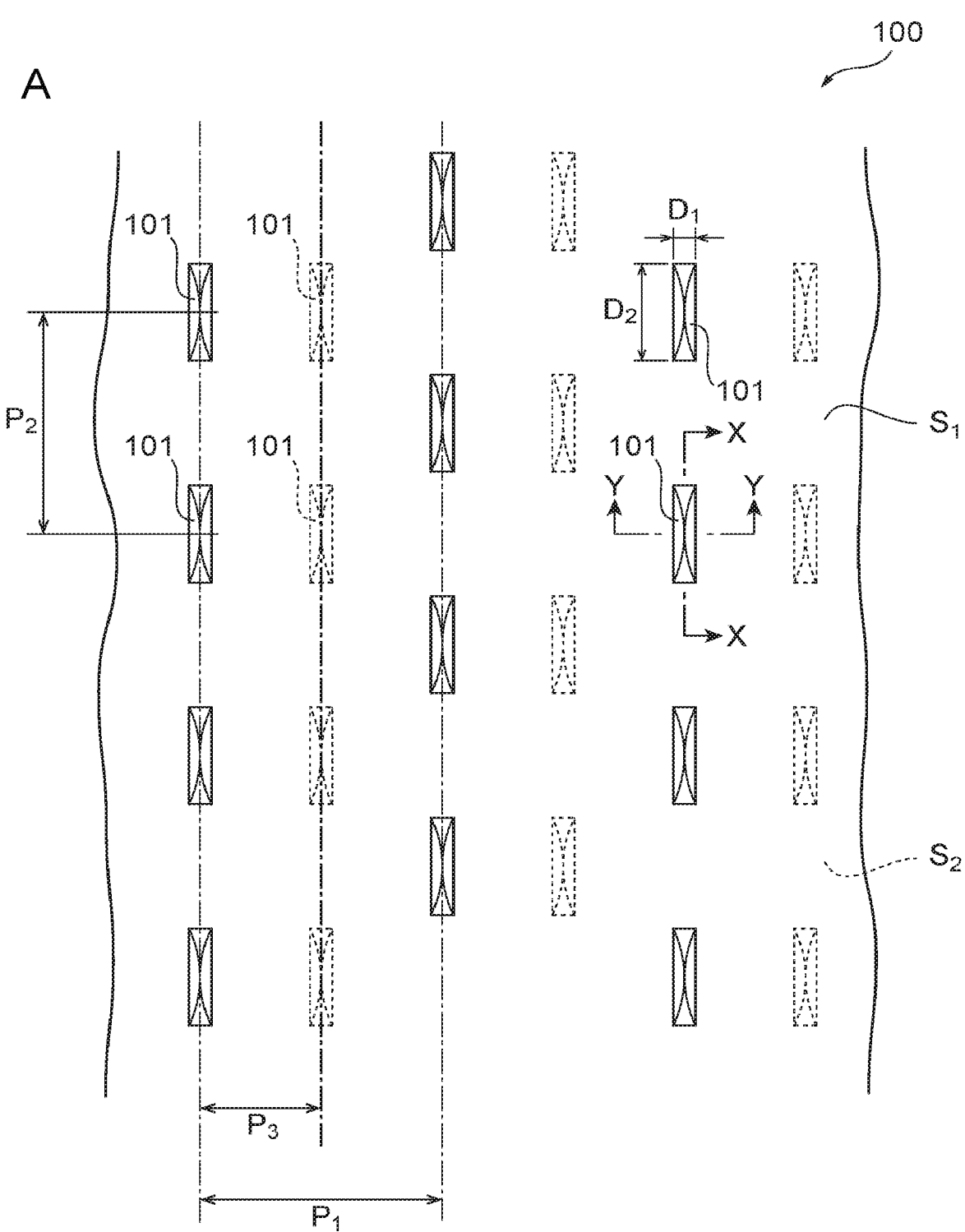
Figure 8:
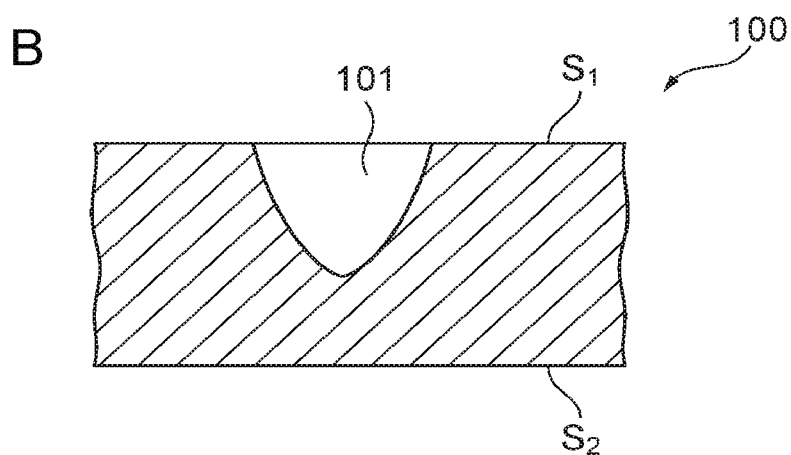
Figure 2:
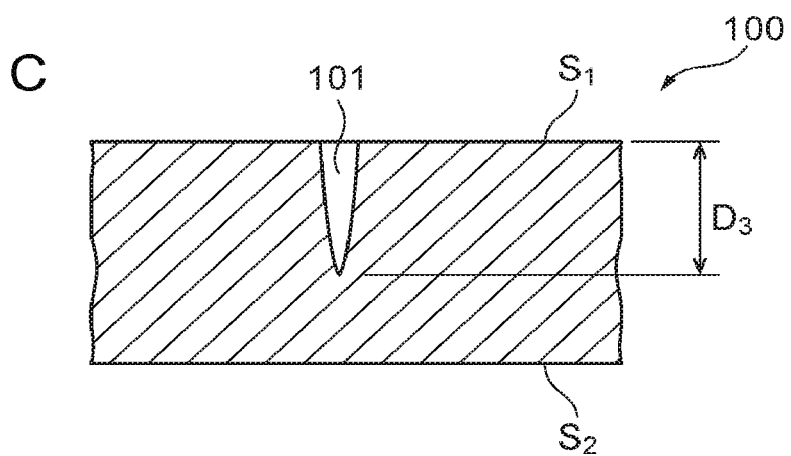

FIG. 8-1 schematically shows an arrangement of a plurality of holes 101 formed on the surface of a porous substrate 100 by incising.

FIG. 8-2B schematically shows an X-X section of a hole 101 shown in FIG. 8-1. FIG. 8-2C shows a Y-Y section of a hole 101 shown in FIG. 8-1.

Figure 9:
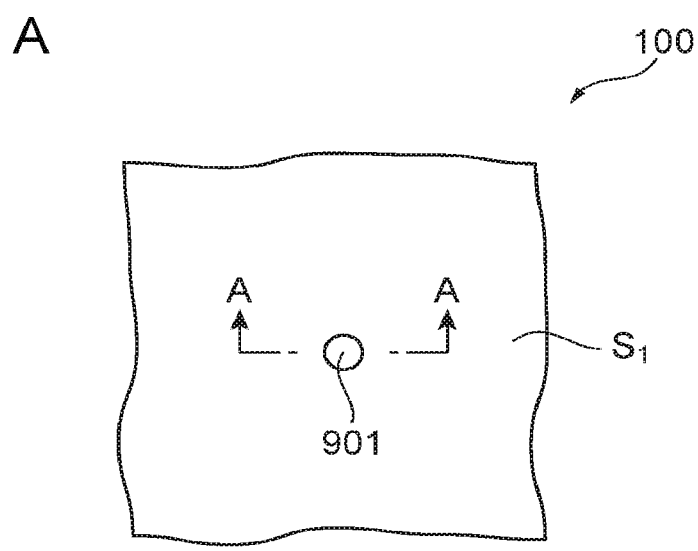
Figure 9:
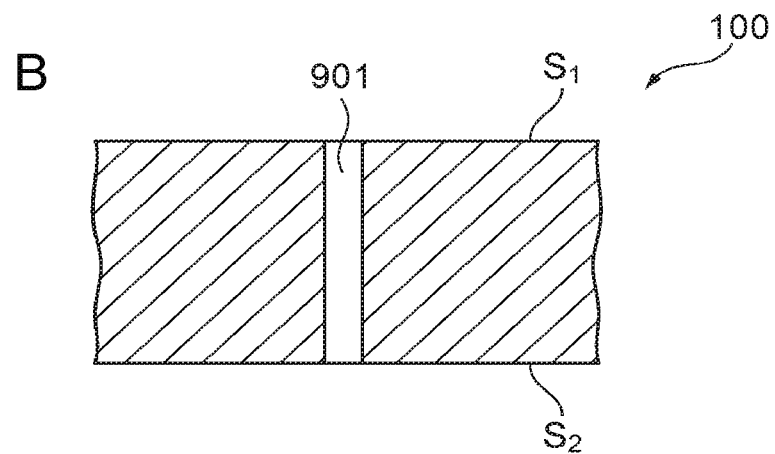

FIG. 9 shows a porous through-hole 901 formed on a surface $S_1$ of a substrate 100 in another embodiment. FIG. 9A shows a through-hole 901 viewed from a direction perpendicular to the surface $S_1$ of the porous substrate 100. FIG. 9B schematically shows an A-A section of the through-hole 901 shown in FIG. 9A.

Figure 10:
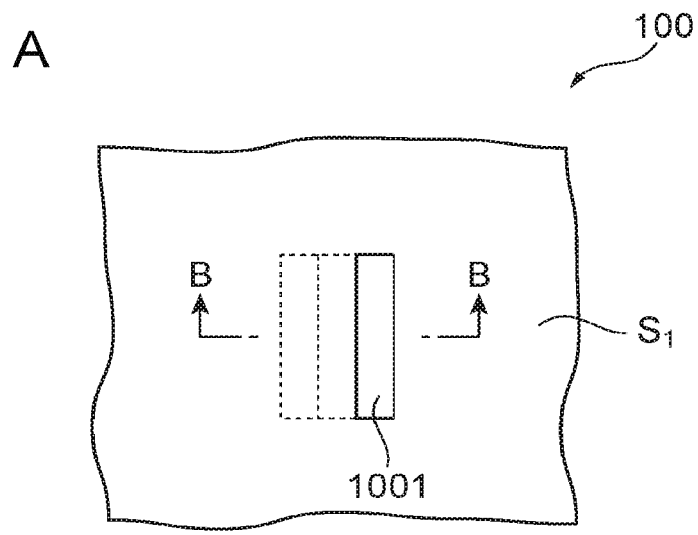
Figure 10:
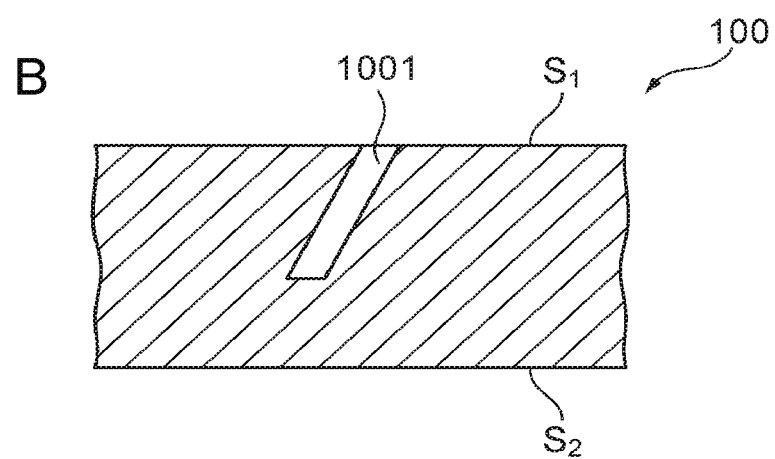

FIG. 10 shows a hole 1001 formed on the surface $S_1$ of the porous substrate 100 in another embodiment. FIG. 10A shows a hole 1001 viewed from a direction perpendicular to the surface $S_1$ of the porous substrate 100. FIG. 10B schematically shows a B-B section of the hole 1001 shown in FIG. 10A.

DESCRIPTION OF EMBODIMENTS

<Porous Substrate>

A porous substrate that can be used for the present invention is a substrate having minute voids with which a heat storage material composition is impregnated and in which it is retained. A substrate itself has such minute voids. Specifically, such voids are formed in a substrate formed with one or more types of materials (e.g., plant fibers, such as wooden fibers, pieces of plants, such as wooden pieces, wooden materials (veneer, timber etc.), plant tissues, such as wooden tissues, inorganic fibers, and minerals) that are artificially gathered or spontaneously coalesce. The voids are located between the aforementioned materials constituting the substrate and/or inside each such material. Such minute voids are different from holes formed by physical processing, such as incising of the porous substrate described below. For example, the plant-based substrate described below is a substrate formed with one or more types of materials (e.g., plant fibers, pieces of plants, wooden material, and plant tissues) that are artificially gathered or spontaneously coalesce. Any plant-based substrate having at least either minute voids formed inside each material or minute voids formed between neighboring materials can be used as a porous substrate. Examples of a porous substrate that can be used in the present invention include a plant-based substrate, an inorganic fiber substrate, a mineral substrate, and a composite substrate comprising two or more types thereof.

The overall shape of the porous substrate is not particularly limited. It may be a board-like shape, a cylindrical shape, a block shape, or the like. Also, the porous substrate in such shape may be subjected to bending work. Here, bending work may be performed before or after the step of impregnating the porous substrate with a heat storage material composition. If the porous substrate has a board-like shape, the thickness thereof is not particularly limited: however, it is usually 3 to 30 mm and preferably 5 to 20 mm. It is preferable that the overall porous substrate is impregnated with the heat storage material composition, although the present invention is not limited thereto. Only the surface layer portion of the porous substrate may be impregnated with the heat storage material composition.

If the density of the porous substrate becomes smaller, it becomes easier for the porous substrate to be impregnated with the heat storage material composition. The density of at least a part of the porous substrate which is impregnated with the heat storage material composition (density before impregnation) is preferably 0.1 g/cm$^3$ or more, more preferably 0.2 g/cm$^3$ or more, and further preferably less than 0.9 g/cm$^3$. In general, it is preferable for the porous substrate to have a low density in order to increase the impregnation rate. For example, the density is preferably less than 0.8 g/cm$^3$, 0.7 g/cm$^3$ or less, 0.6 g/cm$^3$ or less, or 0.5 g/cm$^3$ or less. Different porous substrates are described below regarding a more preferable range of the porous substrate density.

Examples of a plant-based substrate that can be used as the porous substrate include an artificial plant substrate formed by artificially combining two or more plant materials and a natural plant substrate formed with one or more plant materials that spontaneously coalesce (e.g., plant tissue), such as solid wood. Examples of the artificial plant substrate include a molded article formed by gathering and molding a plant material, bonded wood, plywood, and LVL (laminated veneer lumber). Examples of a molded article formed by gathering and molding a plant material include substrates formed by gathering one or more members selected from plant fibers, such as wooden fibers, and small plant pieces, such as wooden pieces. In particular, a wooden molded article selected from a substrate formed by gathering wooden fibers and a substrate formed by gathering wooden pieces is preferable. In the case of the artificial plant substrate, individual plant materials may be optionally bonded each other using an adhesive. Although such adhesive is not particularly limited, for example, one or more adhesives selected from the group consisting of isocyanate-based adhesives, phenol-formaldehyde-based adhesives, urea-formaldehyde-based adhesives, and melamine-formal dehyde-based adhesives can be used.

A substrate obtained by gathering plant fibers, such as wooden fibers, has minute voids between plant fibers. Therefore, it can be impregnated with a large amount of a heat storage material composition. Such substrate obtained by gathering plant fibers can be prepared by optionally mixing plant fibers with an adhesive and subjecting the mixture to compression molding to result in a desired shape, such as a board-like (plate-like) shape, a cylindrical shape, a block shape, or the like. Although such adhesive is not particularly limited, for example, one or more adhesives selected from the group consisting of isocyanate-based adhesives, phenol-formaldehyde-based adhesives, urea-formaldehyde-based adhesives, and melamine-formaldehyde-based adhesives can be used. Preferable plant fibers are wooden fibers. Examples of wooden fibers that can be used include wooden fibers of trioical wood (e.g., lauan), softwood (e.g., pine or cedar), and the like. For molding, compression molding may be carried out with heating. The density of the substrate obtained by gathering plant fibers is preferably 0.1 g/cm$^3$ or more to less than 0.8 g/cm$^3$, particularly preferably 0.2 g/cm$^3$ or more, further preferably 0.5 g/cm$^3$ or less, yet further preferably 0.4 g/cm$^3$ or less, yet further preferably 0.35 g/cm$^3$ or less, yet further preferably 0.3 g/cm$^3$ or less, and yet further preferably 0.2 to 0.3 g/cm$^3$. Typical examples of the substrate obtained by gathering plant fibers, such as wooden fibers include wooden fiber boards, such as a medium density fiber board (MDF) and an insulation board. An insulation board is obtained by molding fibers of a plant, such as wood, as a raw material and has a density of less than 0.35 g/cm$^3$. The density is preferably 0.3 g/cm$^3$ or less and particularly preferably 0.2 to 0.3 g/cm$^3$. A medium density fiber board (MDF) is obtained by molding fibers of a plant, such as wood, as a raw material and has a density of 0.35 g/cm$^3$ or more to less than 0.8 g/cm$^3$.

It is also possible for a substrate obtained by gathering small plant pieces, such as wooden pieces, to be impregnated with a large amount of a heat storage material composition because such substrate has minute voids between or inside small plant pieces. Such substrate obtained by gathering small plant pieces can be prepared by optionally mixing small plant pieces with an adhesive and subjecting the mixture to compression molding so as to result in a desired shape, such as a board-like (plate-like) shape, a cylindrical shape, a block shape, or the like. Although such adhesive is not particularly limited, for example, one or more adhesives selected from the group consisting of isocyanate-based adhesives, phenol-formaldehyde-based adhesives, urea-formaldehyde-based adhesives, and melamine-formaldehyde-based adhesives can be used. Typical examples of small plant pieces, such as wooden pieces, include plant pieces in at least one form selected from among chips, flakes, wafers, and strands. Preferably, small plant pieces are wooden pieces. Examples of wooden pieces that can be used include wooden pieces of trioical wood (e.g., lauan), softwood (e.g., pine or cedar), and the like. For molding, compression molding may be carried out with heating. The density of a substrate obtained by gathering small plant pieces is preferably 0.1 g/cm$^3$ or more to less than 0.9 g/cm$^3$, particularly preferably 0.6 g/cm$^3$ or less, further preferably 0.5 g/cm$^3$ or less, yet further preferably 0.2 g/cm$^3$ or more, yet further preferably 0.3 g/cm$^3$ or more, yet further preferably 0.4 g/cm$^3$ or more, and yet further preferably 0.3 to 0.5 g/cm$^3$. Typical examples of a substrate obtained by gathering small plant pieces include a particle board (PB) and an oriented strand board (OSB). In typical cases, either PB or OSB has a density of 0.4 g/cm$^3$ or more and less than 0.9 g/cm$^3$.

An inorganic fiber substrate may be a substrate formed with inorganic fibers, such as rock wool or glass wool fibers, carbon fibers, or metal fibers, into a board-like (plate-like) shape, a cylindrical shape, a block shape, or the like. An inorganic fiber substrate has minute voids between inorganic fibers. Therefore, it can be impregnated with a large amount of a heat storage material composition. Preferably, the density of an inorganic fiber substrate, such as one formed with rock wool fibers, falls within the aforementioned range of the density of a porous substrate. It is more preferably 0.25 g/cm$^3$ or more and further preferably 0.5 g/cm$^3$ or less.

Examples of a mineral substrate include substrates formed by molding mineral materials in a board-like shape, such as a gypsum board, a calcium silicate board, and an ALC (autoclaved lightweight aerated concrete) board. Such mineral substrate has minute voids formed in mineral tissues constituting the substrate. Therefore, it can be impregnated with a large amount of a heat storage material composition.

The porous substrate used in the present invention is more preferably a porous substrate having a surface that has a plurality of open holes formed thereon. Such configuration allows the surface area of the porous substrate to expand, thereby facilitating impregnation of the porous substrate with the heat storage material composition. This makes it possible to shorten the time required for the impregnation step described below. Specifically, as shown in FIG. 8-1, a porous substrate 100 having surfaces $S_1$, $S_2$ on which a plurality of open holes 101 are formed is used.

The plurality of holes can be formed by processing, such as incising or perforation work using a drill or the like, after formation of the porous substrate. Further, when the porous substrate is formed by molding, the plurality of holes can be formed by molding using a mold in which projections corresponding to the plurality of holes are disposed. According to the present invention, the expression "a plurality of open holes on the surface" used with reference to the formation of such holes in the porous substrate refers to holes formed via the aforementioned physical processing, which differ from minute voids of the porous substrate itself. In the present invention, the density of a porous substrate having a plurality of holes on the surface thereof means the density of the substrate before the formation of the holes and impregnation with the heat storage material composition.

Incising is a type of processing for forming a plurality of holes by impacting the surface of a porous substrate with a cutter, a needle, a laser beam, or the like. Incising can be suitably applied to the various aforementioned porous substrates. Incising using a cutter can be performed by rotating, for example, a roll-shaped incising cutter 70 around its axis, such cutter comprising a plurality of pusher blades 72 projecting from the cutter's circumferential surface as shown in FIG. 7, while pressing the cutter against the surface of the porous substrate. This action allows the pusher blades 72 to be sequentially pushed into the surface of the porous substrate and then sequentially pulled out therefrom, thereby incising the surface of the porous substrate into which the pusher blades 72 have been pushed and extending the incisions so as to form a number of open holes on such surface.

Each of the plurality of holes formed in the porous substrate has an opening area that is preferably 0.2 mm$^2$ or greater, more preferably 1 mm$^2$ or greater, further preferably 2 mm$^2$ or greater, yet further preferably 20 mm$^2$ or less, yet further preferably 15 mm$^2$ or less, and yet further preferably 10 mm$^2$ or less on the surface of the porous substrate. Although the shape of the opening of each of the plurality of holes is not particularly limited, it may be a rectangle (including a long linear quadrilateral extending in a single direction), a polygon, such as a triangle, a circle, an ellipse, or other shapes obtained by flattening one or more of the aforementioned shapes. When the shape of the opening of each hole is a shape extending in a single direction (e.g. a rectangle or another quadrilateral, an oblate circle, an oval, or an oblate oval), the largest width in the lateral direction is preferably 0.5 to 3 mm and more preferably 0.5 to 2 mm, and the largest width in the longitudinal direction is preferably 2 to 20 mm and more preferably 3 to 10 mm.

The distance from the opening to the bottom of each of the plurality of holes formed in the porous substrate in the direction perpendicular to the surface (that is, depth) is not particularly limited. However, it is preferably 3 mm or more, more preferably 4 mm or more, further preferably 20 mm or less, and yet further preferably 15 mm or less. If the porous substrate has a board-like shape, when the thickness of the board-shaped porous substrate at each location where a hole is formed is designated as $T_1$, the depth of each of the plurality of holes can be set to preferably $0.3T_1$ to $1.0T_1$ and more preferably $0.4T_1$ to $0.9T_1$. At such time, the plurality of holes are formed on at least one region of at least one of the two main faces of the board-shaped porous substrate. In addition, only the surface layer portion of the porous substrate may be impregnated with a heat storage material composition. In such case, when the thickness of the surface layer portion from the surface of the porous substrate at each location where a hole is formed is designated as $T_2$, the depth of each of the plurality of holes formed on the surface of the surface layer portion can be set to preferably $0.3T_2$ to $1.0T_2$ and more preferably $0.4T_2$ to $0.9T_2$.

The shape of the aforementioned holes is not particularly limited. In one embodiment, such hole is, for example, a bottomed hole 101 that extends in a direction perpendicular to the surface $S_1$ of the porous substrate 100 shown in FIG. 8-2. In another embodiment, the hole is a through-hole 901 that completely penetrates the porous substrate 100 shown in FIG. 9. Openings are formed as through-holes 901 on the surfaces $S_1$ and $S_2$ of the porous substrate 100. In another embodiment, the hole is a bottomed hole 1001 that extends in a direction that forms a sharp angle with the surface $S_1$ of the porous substrate 100 shown in FIG. 10. In a modified embodiment of a hole 1001 (not shown), the hole is a through-hole that extends in a direction that forms a sharp angle with the surface $S_1$ of the porous substrate 100. Bottomed holes 1001 and modified embodiments of such holes can be easily formed via incising using a laser beam. The aforementioned hole may be a bottomed hole or a through-hole having a bent-shape in a cross sectional view along a plane perpendicular to the surface $S_1$ of the porous substrate 100 (not shown).

Preferably, the plurality of holes formed in the porous substrate are formed on at least one region of the surface of the porous substrate or the surface of a portion of the porous substrate which is to be impregnated with the heat storage material composition. Preferably, the plurality of holes are formed in at least one region of the surface of the porous substrate in a distributed pattern. At such time, the density of the holes in the region is not particularly limited. The holes are formed in a distributed pattern so that the number of the holes per unit area of the region is preferably 500 holes/$m^2$ or more, more preferably 1000 holes/$m^2$ or more, further preferably 2000 holes/$m^2$ or more, yet further preferably 3000 holes/$m^2$ or more, yet further preferably 20000 holes/$m^2$ or less, yet further preferably 15000 holes/$m^2$ or less, yet further preferably 10000 holes/$m^2$ or less, and yet further preferably 8000 holes/$m^2$ or less. Thus, a distributed pattern of the plurality of holes is formed in the region. When the porous substrate has a board-like shape, the plurality of holes are formed on at least one region of and preferably the entire region of preferably at least one of and more preferably both of the two main faces of the board-like porous substrate. Further, when the porous substrate has a cylindrical shape, the plurality of holes are formed on at least one region of and preferably the entire region of the lateral face of the cylindrical porous substrate.

<Heat Storage Material Composition>

The heat storage material composition contained in the heat reservoir of the present invention contains at least a latent heat storage material and a given hydrogenated styrene-based thermoplastic elastomer.

The latent heat storage material that can be used in the present invention is not limited, and may be any material in which a solid-liquid phase change can take place (that is, a phase change material). Typically, it is a latent heat storage material in which a solid-liquid phase change is able to take place due to the solar heat of sunlight, heat generated by indoor heating, or the like. When using the latent heat storage material as a heat storage building material for housing, the phase change temperature of the latent heat storage material (that is, the melting point) should preferably fall within a range preferably from 5° C. to 60° C., more preferably of 15° C. or higher, further preferably of 18° C. or higher, yet further preferably of 35° C. or less, yet further preferably 28° C. or less, yet further preferably from 15° C. to 35° C., and yet further preferably from 18° C. to 28° C. The terms "phase change temperature" and "melting point" used herein indicate values at 1 atm. The term "phase transition temperature" also has the same meaning as the term "phase change temperature".

Examples of the latent heat storage material include: a saturated aliphatic hydrocarbon (preferably linear saturated aliphatic hydrocarbon), such as n-paraffin or paraffin, and having typically 16 to 24 carbon atoms, which may include a saturated aliphatic hydrocarbon comprising or containing at least one selected from the group consisting of n-hexadecane, n-heptadecane, n-octadecane, and n-nonadecane (or optionally a mixture of two or more thereof); a monovalent or polyvalent unsaturated aliphatic hydrocarbon (preferably a linear monovalent or polyvalent unsaturated aliphatic hydrocarbon), such as α-olefin (preferably linear α-olefin), and having typically 16 to 26 (and preferably 24 or less) carbon atoms, which may include a monovalent or polyvalent unsaturated aliphatic hydrocarbon comprising or containing at least one selected from the group consisting of 1-hexadecene, 1-heptadecen, 1-octadecene, 1-nonadecene, and 1-eicosene (or optionally a mixture of two or more thereof); a medium-chain or long-chain fatty acid and having typically 6 to 24 and preferably 8 to 14 carbon atoms, which may include a medium-chain or long-chain fatty acid comprising or containing at least one selected from the group consisting of octanoic acid, capric acid, lauric acid, and myristic acid (or optionally a mixture of two or more thereof); an ester of the above fatty acid; and a polyether compound, such as polyethylene glycol. Preferably, the latent heat storage material is a mixture of one or more members selected from the group consisting of the saturated aliphatic hydrocarbon, the monovalent or polyvalent unsaturated aliphatic hydrocarbon, the medium-chain or long-chain fatty acid, the fatty acid ester, and the polyether compound. More preferably, it is a mixture of one or more members selected from the group consisting of the saturated aliphatic hydrocarbon and the monovalent or polyvalent unsaturated aliphatic hydrocarbon. Further preferably, it is a mixture of one or more members selected from the group consisting of the saturated aliphatic hydrocarbon and α-olefin. For example, n-octadecane is selected for a latent heat storage material having a melting point of 28° C., and n-hexadecane is selected for a latent heat storage material having a melting point of 18° C. Moreover, such latent heat storage materials having different melting points may be mixed. Further, when α-olefin is used as a latent heat storage material, a mixture of different types of α-olefin having different numbers of carbon atoms can be used. The mixture of α-olefin may be a mixture prepared by combining different types of α-olefin so that the phase change temperature falls within the aforementioned range. For example, the mixture preferably contains at least the following: (1) α-olefin having 20 carbon atoms accounting for 40% to 60% by mass of the total amount of α-olefin; and (2) α-olefin having 22 carbon atoms accounting for 25% to 55% by mass of the total amount of α-olefin. Such mixture may contain α-olefin having a different number of carbon atoms. For example, the mixture may further contain one or more of the following: (3) α-olefin having 18 carbon atoms at 5% by mass or less; (4) α-olefin having 24 carbon atoms at 18% by mass or less; and (5) α-olefin having 26 carbon atoms at 1% by mass or less. More preferably, the mixture may comprise two or more types of α-olefin described in at least (1) and (2) among (1) to (5) above. α-Olefin may be a linear molecule or a branched molecule or it may be a mixture of a linear molecule and a branched molecule. However, when α-olefin in the form of a linear molecule is compared with α-olefin in the form of a branched molecule having the same number of carbons, the former has a latent heat storage capacity greater than that of the latter. Therefore, it is preferable to use α-olefin in which a linear molecule is the the main component and, for example, the linear molecule accounts for more than 50% by mass, preferably 60% by mass or more, preferably 70% by mass or more, preferably 80% by mass, and preferably 85% by mass or more of the entire α-olefin. It is more preferable to use α-olefin having any of the aforementioned numbers of carbon atoms in which a linear molecule is the main component and, more preferably, the linear molecule accounts for the above proportion.

Examples of a hydrogenated styrene-based thermoplastic elastomer that can be used include at least one selected from the group consisting of styrene-ethylene/butylene-styrene block copolymer (SEBS), styrene-ethylene/propylene block copolymer (SEP), styrene-ethylene/propylene-styrene block copolymer (SEPS), and styrene-ethylene-ethylene/propylene-styrene block copolymer (SEEPS) (or optionally a mixture of two or more thereof). In particular, at least one selected from the group consisting of styrene-ethylene/butylene-styrene block copolymer (SEBS) and styrene-ethylene-ethylene/propylene-styrene block copolymer (SEEPS) is preferable. SEBS may be referred to as "polystyrene-poly(ethylene/butylene)-polystyrene block copolymer." SEP may be referred to as "polystyrene-poly(ethylene/propylene) block copolymer " SEPS may be referred to as "polystyrene-poly(ethylene/propylene)-polystyrene block copolymer." SEEPS may be referred to as "polystyrene-poly(ethylene-ethylene/propylene)-polystyrene block copolymer." The range of the styrene content in the hydrogenated styrene-based thermoplastic elastomer is not limited; however, it is preferably 25% to 35% by mass of the entire molecule content.

Figure 4:
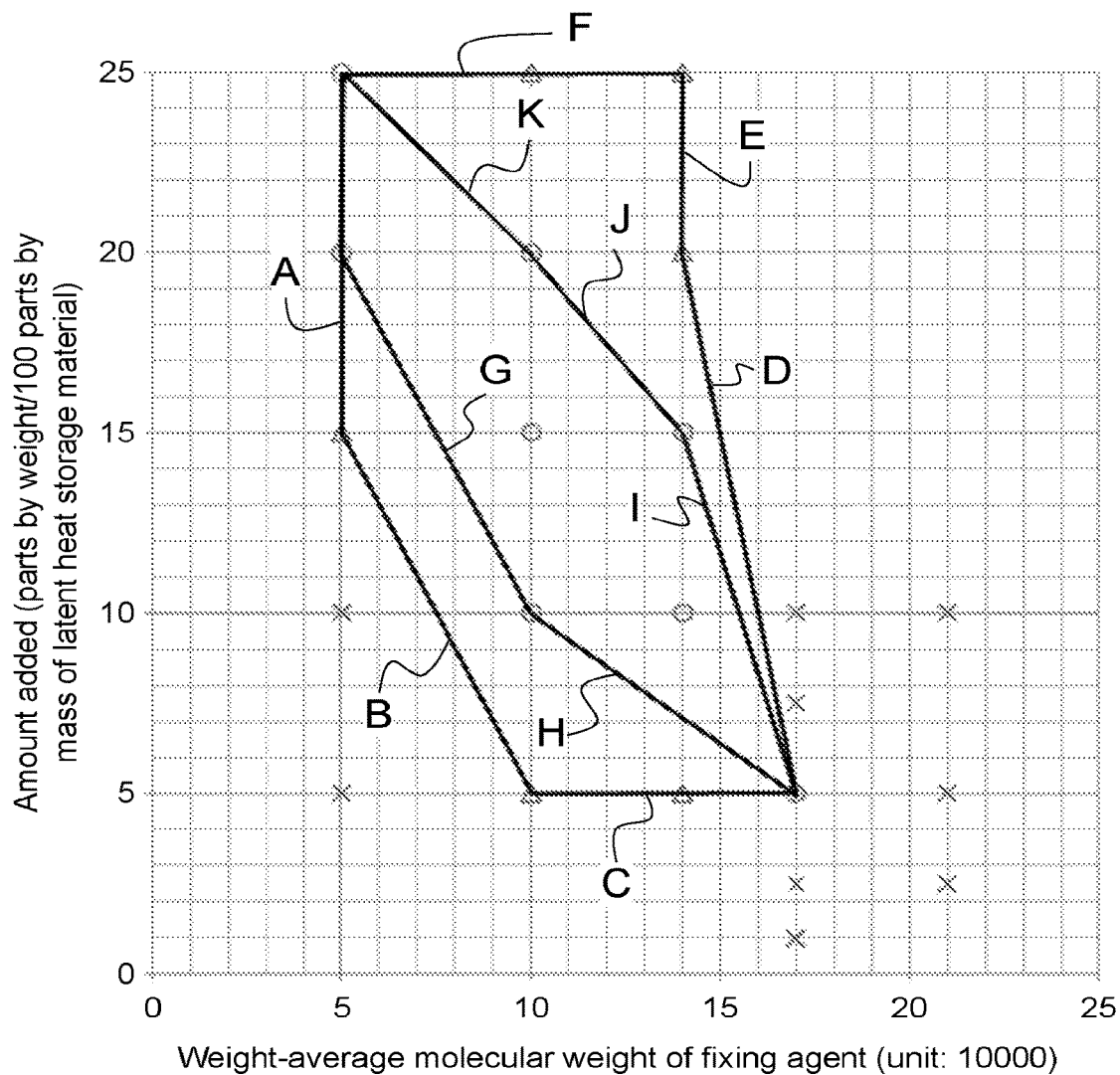
FIG. 4 shows a graph plotting the results represented by "○," "Δ," or "×"

The present inventors found that in order to prevent efflux of a latent heat storage material and a heat storage material composition containing the latent heat storage material from a porous substrate and allow the porous substrate to be impregnated with the heat storage material composition, it is necessary to satisfy the condition (1) described above when the weight-average molecular weight of the hydrogenated styrene-based thermoplastic elastomer is designated as $X \times 10^4$ and the amount of the hydrogenated styrene-based thermoplastic elastomer is designated as Y parts by mass relative to 100 parts by mass of the latent heat storage material in the heat storage material composition. The results of evaluation in Test 3 summarized in FIG. 4 can conclude that the range of the above condition (1) is preferable. In FIG. 4, the horizontal axis represents the weight-average molecular weight of the hydrogenated styrene-based thermoplastic elastomer, and the vertical axis represents the amount of the hydrogenated styrene-based thermoplastic elastomer added. In FIG. 4, the results of comprehensive evaluation of performance of impregnation of the porous substrate with the heat storage material composition and resistance to exudation from the substrate are graded at three levels. The details of evaluation criteria are specified in Test 3 below. In FIG. 4, straight lines including line segments A to K are expressed by the following formulae Straight line including line segment A: $X=5$
Straight line including line segment B: $Y=-2X+25$
Straight line including line segment C: $Y=5$
Straight line including line segment D: $Y=-5X+90$
Straight line including line segment E: $X=14$
Straight line including line segment F: $Y=25$
Straight line including line segment G: $Y=-2X+30$
Straight line including line segment H: $Y=-(5/7)X+(120/7)$
Straight line including line segment I: $Y=-(10/3)X+(185/3)$
Straight line including line segment J: $Y=-1.25X+32.5$
Straight line including line segment K: $Y=-X+30$ Hereinafter, the "straight line including line segment A" to the "straight line including line segment K" are simply referred to as "straight line A" to "straight line K," respectively.

The scope of (X, Y) satisfying the aforementioned condition (1) of the present invention corresponds to a region defined by straight lines A to F in FIG. 4.

Further, the results of Test 2 show that a heat storage material composition for which X and Y satisfy the condition (1) is unlikely to flow out from a porous substrate (that is to say, it is not liquefied when heated at 40° C. and thus the latent heat storage material does not exude) and the porous substrate can be impregnated with such heat storage material composition (having a viscosity of 500 mPa·second or less during melting at 100° C. determined using a B-type viscometer).

According to the present invention, it is further preferable to use a heat storage material composition for which X and Y satisfy the aforementioned condition (2). The scope of (X, Y) satisfying the condition (2) corresponds to a region defined by straight lines A, G, H, I, J, and K in FIG. 4. The results in Test 3 (FIG. 4) show that it is highly advantageous that the heat storage material composition for which the condition (2) is satisfied is unlikely to flow out from a porous substrate and the porous substrate can be impregnated with such heat storage material composition.

Further, when the condition (1) or (2) is satisfied, the weight-average molecular weight of the hydrogenated styrene-based thermoplastic elastomer is preferably 60,000 or more ($X \geq 6$), more preferably 75,000 or more ($X \geq 7.5$), further preferably 85,000 or more ($X \geq 8.5$), and most preferably 90,000 or more ($X \geq 9$). In addition, the weight-average molecular weight of the hydrogenated styrene-based thermoplastic elastomer is preferably 160000 or less ($X \leq 16$), more preferably 150,000 or less ($X \leq 15$), and most preferably 140,000 or less ($X \leq 14$). When the weight-average molecular weight of the hydrogenated styrene-based thermoplastic elastomer falls within the above range, efflux of a heat storage material composition from a porous substrate can be prevented. In addition, the viscosity of the heat storage material composition upon melting is sufficiently low so as to facilitate impregnation of the porous substrate with such heat storage material composition. This is highly advantageous.

According to the present invention, the weight-average molecular weight is calculated as the standard polystyrene equivalent molecular weight based on measurement by gel permeation chromatography (GPC). Tetrahydrofuran can be used as an eluent for measurement by GPC. A column prepared by connecting Tosoh Corporation TSKgel GMHXL, TSKgel G4000HXL, and TSKgel G5000HXL in series can be used as a column for GPC. A gel permeation chromatograph (Tosoh Corporation, HLC-8020) can be used as a GPC apparatus.

The amount of the hydrogenated styrene-based thermoplastic elastomer to be added is not limited as long as the condition (1) or (2) is satisfied. However, the amount of the hydrogenated styrene-based thermoplastic elastomer to be added is preferably 25 parts by mass or less (Y≥25), more preferably 20 parts by mass or less (Y≤20), and further preferably 17.5 parts by mass or less (Y≤17.5) relative to 100 parts by mass of the latent heat storage material. Also, in preferred embodiments, the heat storage material composition contains preferably 6 parts by mass or more (Y≥6) and more preferably 7.5 parts by mass or more (Y≥7.5) of the hydrogenated styrene-based thermoplastic elastomer when the amount of the latent heat storage material is 100 parts by mass. When the amount of the hydrogenated styrene-based thermoplastic elastomer to be added (Y) falls within the above range, efflux of a heat storage material composition from a porous substrate can be prevented. In addition, the viscosity of the heat storage material composition upon melting is sufficiently low so as to facilitate impregnation of the porous substrate with such heat storage material composition. This is highly advantageous It is preferable to prepare a heat storage material composition as a liquid melt so that the viscosity of the heat storage material composition at 100° C. measured using a B-type viscometer is preferably 1000 mPa·s or less, more preferably 500 mPa·s or less, further preferably 150 mPa·s or less, and most preferably 100 mPa·s or less. When the viscosity falls within the above range, a porous substrate is easily impregnated with such heat storage material composition, which is preferable.

Viscosity was determined by a method using a Brookfield rotational viscometer (B-type viscometer) as specified in JIS Z8803-2011 and JIS K7117-1. An ABS-100 (Toki Sangyo Co., Ltd.) was used as the B-type viscometer under the following conditions: rotor size: NO1; rotational speed: 6 to 60 rpm.

<Method for Producing the Heat Reservoir>

The heat reservoir of the present invention can be produced by a method comprising an impregnation step of impregnating a porous substrate with a liquid melt of a heat storage material composition so that the heat storage material composition permeates the porous substrate.

Such molten heat storage material composition can be formed by allowing a latent heat storage material and a hydrogenated styrene-based thermoplastic elastomer to coexist, increase the temperature to a level at which both of them are liquefied, and mix them. The temperature at which both of them are liquefied is preferably 80° C. to 140° C. and more preferably 100° C. to 130° C.

As shown in FIG. 1, in one embodiment of the impregnation step, a porous substrate 1a is immersed in a liquid melt of a heat storage material composition 5a in a tank 9 so that the heat storage material composition 5a is allowed to permeate (voids of) the porous substrate 1a. The time required for immersion of the porous substrate 1a in the liquid melt of the heat storage material composition 5a can be appropriately adjusted depending on types of the porous substrate and the heat storage material composition. Preferably, the time can be appropriately adjusted so that the impregnation rate described below can be achieved. In another embodiment of the impregnation step, the liquid melt of the heat storage material composition 5a is poured or applied over the porous substrate 1a, thereby allowing the heat storage material composition to permeate (voids of) the porous substrate. Also in this embodiment, preferably, the conditions of the impregnation step can be appropriately adjusted so that the impregnation rate described below can be achieved.

The porous substrate 1 (or heat reservoir) which has been impregnated with the heat storage material composition can be obtained by solidifying the heat storage material composition 5a by cooling with any suitable means, such as natural cooling (solidifying step), after the impregnation step. As shown in FIG. 1, prior to the solidifying step, the porous substrate 1 may be placed in an upright position after the impregnation step, thereby optionally removing the heat storage material composition 5a adhering to the surface of the porous substrate 1 or a portion of the heat storage material composition 5a permeating the porous substrate 1 by draining. In addition, it is also possible to remove the heat storage material composition 5a adhering to the surface of the porous substrate 1 after the impregnation step using a scraper or the like before, during, or after solidifying the heat storage material composition 5a (not shown).

<Heat Reservoir of the Present Invention>

The content of the heat storage material composition in the heat reservoir of the present invention can be expressed as the impregnation rate (%) of the formula below.

Impregnation rate=(heat reservoir weight after impregnation−porous substrate weight before impregnation)/(porous substrate weight before impregnation)×100(%)

Specifically, the impregnation rate is a percentage of the weight of the heat storage material composition permeating the porous substrate (=heat reservoir weight after impregnation−porous substrate weight before impregnation) over the weight of the porous substrate before impregnation. In this calculation, the percentage of the weight of the porous substrate before impregnation is 100%.

The impregnation rate for the heat reservoir of the present invention is not particularly limited. However, it is preferably 80% or more, more preferably 100% or more, further preferably 120% or more, and yet further preferably 150% or more, yet further preferably 170% or more, yet further preferably 175% or more, and particularly preferably 180% or more. An increase in the impregnation rate results in the improvement of heat storage capacity per unit area of the heat reservoir of the present invention, which is preferable. The upper limit of the impregnation rate is not particularly limited; however, it is generally 250% or less and typically 230% or less.

When the heat reservoir of the present invention is used alone or in combination with other materials as a material constituting a part or parts of a building, such as floors, ceilings, roofs, interior walls, and/or outer walls, it is possible to impart heat storage ability to such part or parts. In particular, it is possible to reduce heating and cooling loads using the heat reservoir of the present invention for a building's outer wall. Specifically, it is possible to store heat energy generated by an air conditioner at night so as to use such heat in the daytime, and vice versa (that is, it is possible to store heat energy in the daytime so as to use such heat at night) by utilizing the latent heat of the latent heat storage material contained in the heat storage material composition (that is, a phase transition material). For example, if a first heat reservoir prepared by impregnating a porous substrate with a heat storage material composition comprising a latent heat storage material having a melting point of 28° C. and a second heat reservoir prepared by impregnating a porous substrate with a heat storage material composition comprising a latent heat storage material having a melting point of 18° C. are installed in the inner wall surface of a building, it is possible to cause a phase transition in the latent heat storage material having a melting point of 28° C. of the first heat reservoir at high temperatures in summer and in the latent heat storage material having a melting point of 18° C. of the second heat reservoir at low temperatures in winter. Therefore, it is possible to reduce interior temperature variation throughout the year. Accordingly, it is possible to reduce annual energy consumption (that is, electric power consumption) of heating and cooling equipment.

The present inventors also confirmed from experimental data that air conditioning loads in summer and winter could be reduced based on calculation of the heat flux through the wall on which the first and second heat storage bodies had been installed. Specifically, it was confirmed that the interior heat load in the daytime could be decreased by 30% or more by installing the heat storage bodies on the wall surface and running an air conditioner during the night so as to performing heat storage.

EXAMPLES

The term "part(s)" used with reference to the following tests means "part(s) by mass."

In the following tests, viscosity was determined by a method using a Brookfield rotational viscometer (B-type viscometer) as specified in JIS Z8803-2011 and JIS K7117-1. An ABS-100 (Toki Sangyo Co., Ltd.) was used as the B-type viscometer under the following conditions: rotor size: NO1; rotational speed: 6 to 60 rpm.

In the following tests, the weight-average molecular weight of a thermoplastic elastomer was obtained as a standard polystyrene equivalent molecular weight through gel permeation chromatography (GPC) under the following conditions.
Measurement equipment: Tosoh Corporation Gel permeation chromatograph (HLC-8020)
Column: Column prepared by connecting Tosoh Corporation TSKgel GMHXL, TSKgel G4000HXL, and TSKgel G5000HXL in series
Eluent: Tetrahydrofuran
1. Test 1

This test is aimed at determining a fixing agent having excellent ability to fix a latent heat storage material (paraffin) and excellent impregnation performance when heat melted.

1.1. Sample
Normal paraffin (with 18 carbon atoms) having a melting point of 28° C. was used as a latent heat storage material.
A styrene-butadiene-styrene block copolymer (SBS) having a weight-average molecular weight of 130,000 was used as a styrene-based thermoplastic elastomer.
A styrene-ethylene/butylene-styrene block copolymer (SEBS) having a weight-average molecular weight of 50,000 or 280,000 was as used as a hydrogenated styrene-based thermoplastic elastomer. The styrene content of such SEBS was 30% by mass.
1.2. Test method
A fixing agent (10 parts) was added to a latent heat storage material (100 parts), followed by melt mixing during heating at 100° C. to 130° C. The agents listed in the table below were used as fixing agents.
The viscosity of each mixture in a molten state at 100° C. was evaluated using a B-type viscometer.
About 100 g of each molten mixture was poured into a 200-cc cup and solidified by cooling at 20° C.
1.3. Performance Evaluation of Fixing Agents
Evaluation 1:
The cup containing the solidified mixture was placed in a dryer at 40° C. to check the status of the mixture and the occurrence or nonoccurrence of exudation of the latent heat storage material 1 day later.
Evaluation 2:
Many holes each having a diameter of about 2 mm were opened in the bottom of the cup containing the solidified mixture. The cup was stored for 3 days in a dryer at 40° C. to evaluate the volume of exuding matter. Evaluation was further carried out to determine whether the exuding matter was the latent heat storage material or the mixture of the latent heat storage material and the fixing agent. The volume of exuding matter was calculated as the percentage of the mass of the exuding matter over the mass of the tested mixture.
1.4. Results of Evaluation 1
The table below shows the results of Evaluation 1 (in terms of the status of compositions and evaluation of exudation when heated at 40° C.).
When a hydrogenated styrene thermoplastic elastomer was used as a fixing agent, exudation was not observed when the latent heat storage material was liquefied (40° C.). Accordingly, the gel state of the corresponding mixture was maintained.

TABLE 1

| Fixing agent | | | Mixture of heat storage material + fixing agent (heat storage material composition) | | |
|---|---|---|---|---|---|
| Type | Melting point (° C.) | Molecular weight (unit: 10000) | Viscosity upon melting at 100° C. (mPa · s) | Material state upon melting at 40° C.*1 | Exudation of heat storage material upon melting at 40° C. |
| Paraffin wax | 69 | — | 5 | x | — |
| Polyethylene wax | 64 | — | 5 | x | — |
| Polyethylene wax | 107 | — | 5 | x | — |
| Low-density polyethylene | 90 | — | 80 | ○ | Confirmed |
| Ethylene·vinyl acetate copolymer resin | 89 | — | 30 | ○ | Confirmed |
| Styrene-based thermoplastic elastomer | — | 13 | 48 | Δ | Confirmed |
| Hydrogenated styrene-based thermoplastic elastomer | — | 5 | 15 | Δ | Not confirmed |

TABLE 1-continued

| | Fixing agent | | Mixture of heat storage material + fixing agent (heat storage material composition) | | |
| --- | --- | --- | --- | --- | --- |
| | | | Viscosity upon | | Exudation of heat |
| Type | Melting point (° C.) | Molecular weight (unit: 10000) | melting at 100° C. (mPa · s) | Material state upon melting at 40° C.*[1] | storage material upon melting at 40° C. |
| Hydrogenated styrene-based thermoplastic elastomer | — | 28 | ≥1000 | ○ | Not confirmed |
| 12-hydroxystearic acid | 75 | — | 5 | ○ | Confirmed |

*[1]Material state upon melting at 40° C.: ○: gel; Δ; highly viscous liquid; x: liquid

1.5. Results of Evaluation 2

The table below shows the results of Evaluation 2 (in terms of evaluation of exuding matter and the volume thereof during storage at 40° C.)

In the test group using substances other than elastomers as fixing agents, only the latent heat storage material was liquefied and exuded from the mixture during heating at 40° C.

It was confirmed that when using a hydrogenated styrene-based thermoplastic elastomer as a fixing agent, adjusting the molecular weight can prevent exudation during heating at 40° C.

The temperature of the obtained molten mixture was adjusted to 100° C. and the viscosity thereof was evaluated using a B-type viscometer.

About 100 g of the molten mixture was poured into a 200-cc cup and solidified by cooling at 20° C.

2.3. Evaluation of Ability to Fix Latent Heat Storage Material

The cup containing the solidified mixture was placed in a dryer at 40° C. in order to check the status of the mixture and the occurrence or nonoccurrence of exudation of the latent heat storage material 1 day later.

TABLE 2

| | Fixing agent | | Mixture of heat storage material + fixing agent (heat storage material composition) | | | |
| --- | --- | --- | --- | --- | --- | --- |
| | | | Viscosity upon | Exudation rate upon heating at 40° C. | | |
| Type | Melting point (° C.) | Molecular weight (unit: 10000) | melting at 100° C. (mPa · s) | 1 day later (%) | 3 days later (%) | Matter exuding upon melting at 40° C. |
| Low-density polyethylene | 90 | — | 80 | 17.3 | 20.5 | Heat storage material |
| Ethylene•vinyl acetate copolymer resin | 89 | — | 30 | 33.5 | 38.4 | Heat storage material |
| Styrene-based thermoplastic elastomer | — | 13 | 48 | 45.0 | 53.8 | Mixture |
| Hydrogenated styrene-based thermoplastic elastomer | — | 5 | 15 | 6.1 | 27.8 | Mixture |
| Hydrogenated styrene-based thermoplastic elastomer | — | 28 | ≥1000 | 0.0 | 0.1 | Not confirmed |
| 12-hydroxystearic acid | 75 | — | 5 | 16.0 | 21.4 | Heat storage material |

2. Test 2

Test 1 confirmed that hydrogenated styrene-based thermoplastic elastomers have excellent ability to fix a latent heat storage material (paraffin). Test 2 is aimed at clarifying the effects of the molecular weights and amounts of such elastomers on the ability to fix a latent heat storage material and impregnation performance (melt viscosity) during melting by heating.

2.1. Sample

Normal paraffin (with 18 carbon atoms) having a melting point of 28° C. was used as a latent heat storage material.

The hydrogenated styrene-based thermoplastic elastomer used herein was a styrene-ethylene/butylene-styrene block copolymer (SEBS) having weight-average molecular weights of 50,000, 100,000, 170,000, 210,000, 250,000, or 280,000. The styrene content in SEBS was 30% by mass, 30% by mass, 32% by mass, 33% by mass, 30% by mass, or 30% by mass, respectively.

2.2. Test Method

The fixing agent was added in different amounts as shown in the table below to the latent heat storage material (100 parts), followed by melt mixing during heating at 100° C. to 130° C.

2.4. Results

The table below shows the results of the above evaluation.

As the molecular weight and amount of the fixing agent to be added were increased, the melt viscosity of the mixture increased.

The volume of the latent heat storage material exuding from the mixture at 40° C., at which the latent heat storage material liquefies, varied depending on the amount of the fixing agent added. It was confirmed that the latent heat storage material exuded when the amount of the fixing agent added was 2.5 parts or less, and that this exudation could be prevented with the addition of 5 or more parts of the fixing agent.

Observation of the material state of the mixture during heating at 40° C. revealed that, when the molecular weight or amount of the fixing agent added is small, the mixture liquefies and flows.

The melt viscosity of the mixture greatly increased when the molecular weight of the fixing agent was 200,000 or greater. A mixture with a high melt viscosity is expected to experience a significant decrease in wooden board impregnation performance.

When the molecular weight of the fixing agent was 50,000, the mixture tended to flow during heating (40° C.), making it difficult to retaining the latent heat storage material.

TABLE 3

| Hydrogenated styrene-based thermoplastic elastomer (fixing agent) | | Mixture of heat storage material + fixing agent (heat storage material composition) | | |
|---|---|---|---|---|
| Molecular weight (unit: 10000) | Amount added (part) | Viscosity upon melting at 100° C. (mPa · s) | Exudation of heat storage material upon melting at 40° C. | Material state upon melting at 40° C.* |
| 5 | 5 | 10 | — | x |
|   | 10 | 20 | Not confirmed | Δ |
|   | 15 | 45 | Not confirmed | ○ |
|   | 20 | 100 | Not confirmed | ○ |
| 10 | 5 | 10 | Not confirmed | ○ |
|   | 10 | 35 | Not confirmed | ○ |
|   | 15 | 150 | Not confirmed | ○ |
| 17 | 1 | 10 | Confirmed | ○ |
|   | 2.5 | 15 | Confirmed | ○ |
|   | 5 | 95 | Not confirmed | ○ |
|   | 7.5 | ≥1000 | Not confirmed | ○ |
|   | 10 | ≥1000 | Not confirmed | ○ |
| 21 | 5 | ≥1000 | Not confirmed | ○ |
| 25 | 0.5 | 10 | — | x |
|   | 1 | 50 | Confirmed | ○ |
|   | 1.5 | 380 | Confirmed | ○ |
|   | 2.5 | 600 | Confirmed | ○ |
|   | 5 | ≥1000 | Not confirmed | ○ |
|   | 10 | ≥1000 | Not confirmed | ○ |
| 28 | 5 | ≥1000 | Not confirmed | ○ |

*Material state upon melting at 40° C.: ○: gel; Δ: highly viscous liquid; x: liquid 3. Test 3

This test is aimed at evaluating the impregnation performance of mixtures of a latent heat storage material (paraffin) and a fixing agent with which a wooden board was impregnated and exudation resistance (retention ability) of such mixtures.

3.1. Sample

An insulation board (density: 0.27 g/cm$^3$; thickness: 15 mm) was used as a wooden board. Such insulation board was prepared by molding wood fiber as a starting material, and it had a density of less than 0.35 g/cm$^3$.

Normal paraffin (with 18 carbon atoms) having a melting point of 28° C. was used as a latent heat storage material.

A hydrogenated styrene-based thermoplastic elastomer was used as a fixing agent.

The hydrogenated styrene-based thermoplastic elastomer used herein was a styrene-ethylene/butylene-styrene block copolymer (SEBS) having a weight-average molecular weight of 50,000, 100,000, 140,000, 170,000, or 210,000.

3.2. Test Method

The latent heat storage material (paraffin) and the fixing agent were mixed to result in the proportions listed in table 4, followed by melt mixing in a kneader at 100° C. to 130° C. Thus, different mixtures (heat storage material compositions) of the fixing agent and the latent heat storage material were prepared.

Each heat storage material composition was heat-melted in a vat at 100° C. to 110° C. An insulation board (200×200 mm) was immersed in each molten resultant, thereby allowing such insulation board to be impregnated with a different heat storage material composition. The immersion time was set to 10 minutes.

(Details of Evaluation 1): Effects of Molecular Weight and Amount of the Added Fixing Agent on Impregnation Performance Each insulation board was removed from the vat after immersion for 10 minutes. The status of impregnation of the insulation board with the heat storage material composition was graded at a level of "○," "Δ," or "x."

In addition, the weight was measured before and after impregnation so as to calculate the rate of impregnation.

(Evaluation of Impregnation Performance)

○:

State in which the status of impregnation is highly satisfactory, draining of liquid of the heat storage material composition is highly satisfactory, and substantially no film of the heat storage material composition is formed on the board surface

Δ:

State in which a certain degree of impregnation is achieved while draining of liquid of the heat storage material composition is relatively poor, and a film of the heat storage material composition is formed to a slight degree on the board surface x:

State in which impregnation is poor, draining of liquid of the heat storage material composition is also poor, and a film of the heat storage material composition is formed across the board surface Impregnation rate=(board weight after impregnation−board weight before impregnation)/(board weight before impregnation)×100(%)

Further, the viscosity of each heat storage material composition at 100° C. was determined using a B-type viscometer.

(Details of Evaluation 2): Effects of Molecular Weight and Amount of the Added Fixing Agent on Resistance to Exudation of the Heat Storage Material Composition from the Board Each board impregnated with a heat storage material composition was placed in a dryer at 40° C. for 1 month. A decrease in the board weight was determined before and after the 1 month of placement so as to calculate the rate of exudation of the heat storage material composition from the board.

Exudation rate=(board weight before the 1 month–board weight after the 1 month)/(board weight before the 1 month)×100(%)

(Evaluation of Exudation Resistance)
◯:
Exudation rate of 0%
Δ:
Exudation rate greater than 0% and less than 1%
x:
Exudation rate of 1% or greater (1) If the amount of the fixing agent added is increased, the viscosity of the mixture rises, resulting in reduction of board impregnation performance.

(2) If the molecular weight of the fixing agent is increased, the viscosity of the mixture rises, even when the amount thereof to be added remains the same, resulting in reduction of board impregnation performance.

(3) If the amount of the fixing agent added is decreased, resistance to exudation of the mixture from the board declines (facilitating elution).

(4) If the molecular weight of the fixing agent is decreased, resistance to exudation of the mixture from the board declines (facilitating elution).

FIG. 4 shows a graph plotting the results represented by "◯," "Δ," or "x"
of comprehensive evaluation. The desired conditions of the molecular weight and amount of the fixing agent added fall within the area defined by straight lines A, B, C, D, E, and F and more preferably the area defined by straight lines A, G, H, I, J, and K. The formula of each straight line is described above.

TABLE 4

Effects of the molecular weight and amount of the fixing agent added on board impregnation performance and exudation resistance

| Molecular weight of fixing agent (unit: 10000) | Amount of fixing agent added (part) | Viscosity of liquid mixture at 100° C. mPa·s | Impregnation performance Liquid draining ◯, Δ, x | 10-minute impregnation rate % | Exudation rate after 1 month % | Resistance to exudation from board ◯, Δ, x | Comprehensive evaluation ◯, Δ, x |
|---|---|---|---|---|---|---|---|
| 5 | 5 | 10 | ◯ | 183 | 3.6 | x | x |
|   | 10 | 20 | ◯ | 192 | 1.2 | x | x |
|   | 15 | 45 | ◯ | 161 | 0.2 | Δ | Δ |
|   | 20 | 100 | ◯ | 116 | 0 | ◯ | ◯ |
|   | 25 | 180 | ◯ | 89 | 0 | ◯ | ◯ |
| 10 | 5 | 10 | ◯ | 188 | 0.4 | Δ | Δ |
|   | 10 | 35 | ◯ | 133 | 0 | ◯ | ◯ |
|   | 15 | 150 | ◯ | 110 | 0 | ◯ | ◯ |
|   | 20 | 320 | ◯ | 77 | 0 | ◯ | ◯ |
|   | 25 | 550 | Δ | 42 | 0 | ◯ | Δ |
| 14 | 5 | 20 | ◯ | 132 | 0.3 | Δ | Δ |
|   | 10 | 50 | ◯ | 100 | 0 | ◯ | ◯ |
|   | 15 | 210 | ◯ | 91 | 0 | ◯ | ◯ |
|   | 20 | 490 | Δ | 43 | 0 | ◯ | Δ |
|   | 25 | 1000 | Δ | 20 | 0 | ◯ | Δ |
| 17 | 1 | 10 | ◯ | 152 | 1.7 | x | x |
|   | 2.5 | 15 | ◯ | 138 | 1.4 | x | x |
|   | 5 | 95 | ◯ | 106 | 0 | ◯ | ◯ |
|   | 7.5 | 1000< | x | x | — | — | x |
|   | 10 | 1000< | x | x | — | — | x |
| 21 | 2.5 | 500 | Δ | 41 | 1.3 | x | x |
|   | 5 | 1000< | x | x | — | — | x |
|   | 10 | 1000< | x | x | — | — | x |

(Comprehensive Evaluation)

Comprehensive fixing agent evaluation was carried out in terms of board impregnation performance in relation to the heat storage material composition and resistance to exudation of the heat storage material composition from the board.
◯: Both impregnation performance and exudation resistance are evaluated as ◯.
Δ: Either impregnation performance or exudation resistance is evaluated as ◯ while the other variable is evaluated as Δ, or both thereof are evaluated as Δ.
x: Either or both impregnation performance and/or exudation resistance is/are evaluated as x.

3.3. Results

Figure 2:
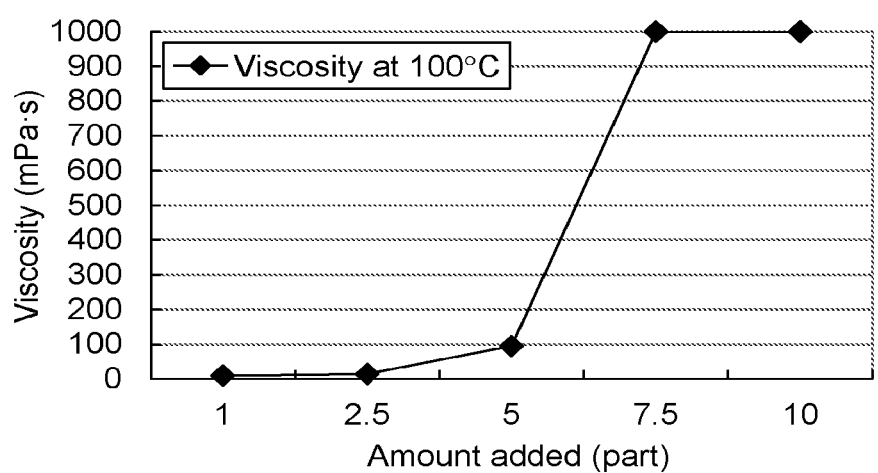
Figure 2:
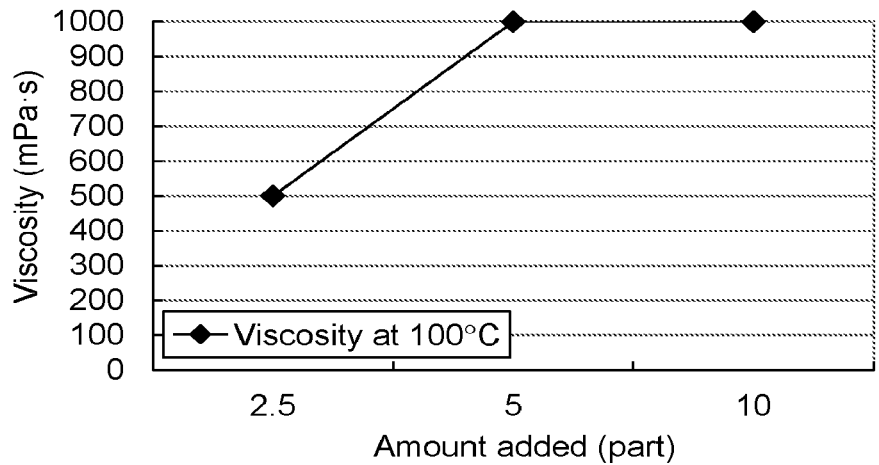
Figure 3:
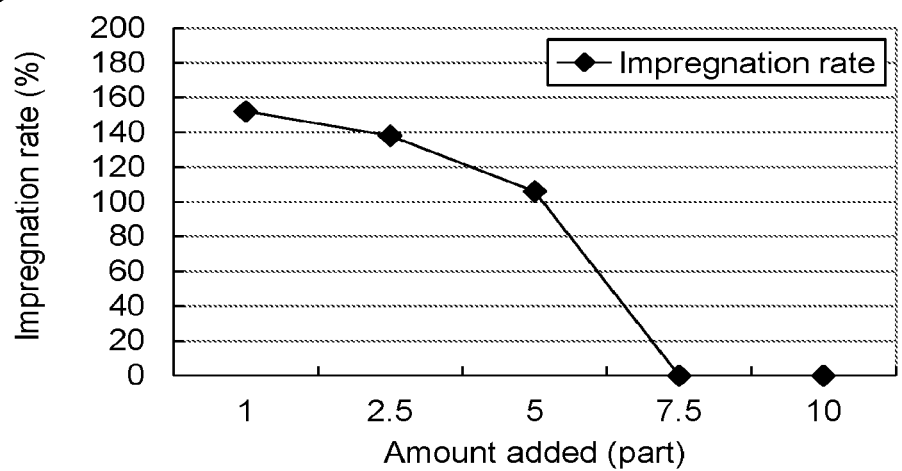
Figure 2:
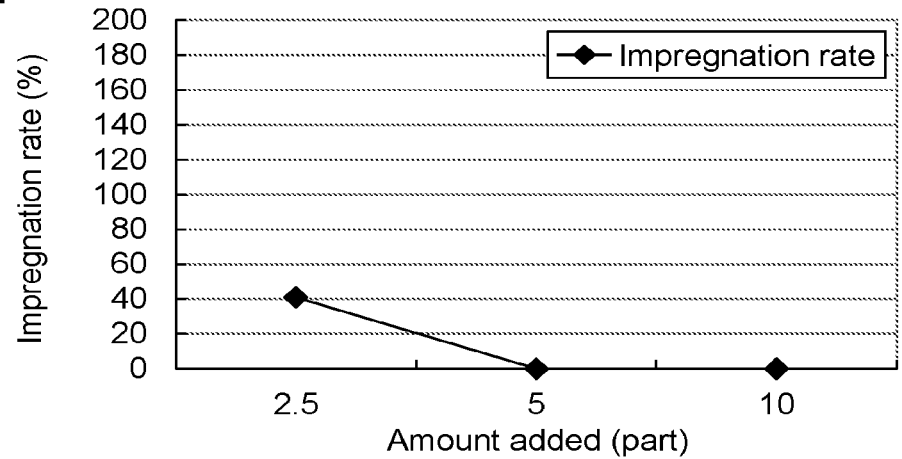

Table 4 and FIGS. 2-1, 2-2, 3-1, and 3-2 show the results of the above evaluation.

4. Test 4

This test is aimed at evaluating impregnation performance of a mixture of a latent heat storage material (α-olefin) and a fixing agent when a wooden board is impregnated with the mixture.

4.1. Sample

An insulation board (density: 0.27 g/cm$^3$; thickness: 15 mm) was used as a wooden board.

Such insulation board was prepared by molding wood fiber as a starting material, and it had a density of less than 0.35 g/cm$^3$.

α-olefin having a melting point of 32° C. was used as a latent heat storage material. Such α-olefin had the following composition: C18: 5% by mass or less; C20: 40% to 60% by mass; C22: 25% to 50% by mass; C24: 18% by mass or less;

and C26: 1% by mass or less. This α-olefin contained linear molecules as the main component.

A hydrogenated styrene-based thermoplastic elastomer was used as a fixing agent.

The hydrogenated styrene-based thermoplastic elastomer used herein was a styrene-ethylene/butylene-styrene block copolymer (SEBS) having a weight-average molecular weight of 100,000, 170,000, or 210,000. The styrene content in SEBS was 30% by mass, 32% by mass, or 33% by mass, respectively.

4.2. Test Method (Details of Evaluation): Effects of Melt Viscosity of the Mixture of the Latent Heat Storage Material (α-Olefin) and the Fixing Agent on Impregnation Performance The latent heat storage material (α-olefin) and the fixing agent were mixed at the proportions listed in Table 5, followed by melt mixing in a kneader at 100° C. to 130° C. Thus, different mixtures (heat storage material compositions) of the fixing agent and the latent heat storage material were prepared.

Each heat storage material composition was heat-melted in a vat at 100° C. to 110° C. An insulation board (200×200 mm) was immersed in each molten resultant in a liquid state, thereby allowing such insulation board to be impregnated with a different heat storage material composition. The immersion time was set to 10 minutes.

Each insulation board was removed from the vat after immersion for 10 minutes. The weight was measured before and after impregnation so as to calculate the rate of impregnation.

Impregnation rate=(board weight after impregnation−
board weight before impregnation)/(board
weight before impregnation)×100(%)

In addition, the viscosity of the heat storage material composition at 100° C. was determined using a B-type viscometer.

4.3. Results

Table 5 shows the results. The measurement results of the viscosity of the mixture (heat storage material composition) of the latent heat storage material, α-olefin, and the fixing agent upon melting by heating and the insulation board impregnation performance thereof were substantially comparable to the results obtained in Evaluation 1 in Test 3 in which parafin was used as the latent heat storage material.

Such insulation board is a low-density wooden fiber board (thickness: 12 mm; density: 0.26 g/cm$^3$).

Such rock wool board is a low density inorganic fiber board obtained by forming artificial mineral fibers produced by dissolving iron and steel slag at a high temperature into a board shape (thickness: 11 mm; density: 0.34 g/cm$^3$).

α-Olefin having a melting point of 32° C. was used as the latent heat storage material. Such α-olefin had the following composition: C18: 5% by mass or less; C20: 40% to 60% by mass; C22: 25% to 50% by mass; C24: 18% by mass or less; and C26: 1% by mass or less. This α-olefin contain linear molecules as the main component.

A hydrogenated styrene-based thermoplastic elastomer (styrene-ethylene/butylene-styrene block copolymer (SEBS)) having a weight-average molecular weight of 100,000 was used as a fixing agent. The styrene content in SEBS was 30% by mass.

5.2. Test Method

SEBS (15 parts) described above was added to the latent heat storage material (100 parts), followed by melt mixing in a kneader at 100° C. to 13° C. Thus, a mixture (heat storage material composition) of the fixing agent and the latent heat storage material was prepared.

The heat storage material composition was heat-melted in a vat at a temperature of from 100° C. to 110° C. The substrate (200×200 mm) was immersed in the liquid melt so that the substrate was impregnated with the mixture. The immersion time was set to 2 minutes, 5 minutes, 10 minutes, and 20 minutes.

(Details of Evaluation 1): Evaluation of Performance of Impregnation of the Board with the Heat Storage Material Composition After the elapse of a certain period of time for immersion, the substrate was removed from the vat. The weight of the substrate was determined before and after impregnation so as to calculate the impregnation rate.

Impregnation rate=(board weight after impregnation−
board weight before impregnation)/(board
weight before impregnation)×100(%)

Impregnation level=board density(kg/m$^3$)×board
thickness(m)×impregnation rate (%)/100(kg/m$^2$)

TABLE 5

Viscosity and impregnation rate of mixture of latent heat storage material and fixing agent

| | | α-olefin | | Paraffin | |
|---|---|---|---|---|---|
| Molecular weight of fixing agent (unit: 10000) | Amount of fixing agent added (part) | Viscosity of mixture mPa · s | Impregnation rate % | Viscosity of mixture mPa · s | Impregnation rate % |
| 10 | 5 | 12 | 182 | 10 | 188 |
| 10 | 10 | 40 | 128 | 35 | 133 |
| 10 | 15 | 146 | 106 | 150 | 110 |
| 17 | 5 | 100 | 100 | 95 | 106 |
| 21 | 2.5 | 625 | 55 | 500 | 41 |

5. Test 5

This test is aimed at evaluating performance of impregnation of an inorganic fiber board with a latent heat storage material.

5.1. Sample

An insulation board (IB) and a rock wool board (RB) were used as a substrate to be impregnated with a latent heat storage material.

(Details of Evaluation 2): Evaluation of Resistance to Exudation of the Heat Storage Material Composition from the Board The board impregnated with the heat storage material composition was placed in a dryer at 40° C. for 1 month. A decrease in the board weight was determined before and after the 1 month of placement so as to calculate the rate of exudation of the heat storage material composition from the board.

Exudation rate=(board weight before the 1 month–board weight after the 1 month)/(board weight before the 1 month)×100(%)

5.3. Results

Table 6 and FIGS. 5 and 6 show the results.

TABLE 6

Impregnation time, impregnation rate, impregnation volume, and exudation rate of IB and RB

| Substrate to be impregnated | Density g/cm³ | Impregnation time Minute | Impregnation rate % | Impregnation volume kg/m² | Exudation rate % |
|---|---|---|---|---|---|
| IB | 0.26 | 2 | 117 | 3.7 | 0 |
|  | 0.26 | 5 | 153 | 4.8 | 0 |
|  | 0.26 | 10 | 203 | 6.3 | 0 |
|  | 0.27 | 20 | 197 | 6.4 | 0 |
| RB | 0.35 | 2 | 120 | 5.0 | 0 |
|  | 0.34 | 5 | 146 | 6.0 | 0 |
|  | 0.34 | 10 | 155 | 6.3 | 0 |
|  | 0.34 | 20 | 147 | 6.0 | 0 |

RB showed an impregnation level comparable to that of IB. Therefore, it was confirmed that impregnation performance of the heat storage material composition is favorable for inorganic fiber boards as well as organic fiber boards. In addition, the impregnation rate for RB is lower than that for IB. This is due to a difference in board density.

Boards prepared by impregnating the above RB and IB with the heat storage material composition were placed in a dryer at 40° C. for 1 month. The exudation rate of the heat storage material composition was 0% for each board.

6. Test 6

The improvement of performance of impregnation of the substrate with the heat storage material composition was confirmed in the case in which a plurality of holes were formed on the substrate surface via incising.

Normal paraffin (with 16 carbon atoms) having a melting point of 18° C. or normal paraffin (with 18 carbon atoms) having a melting point of 28° C. was used as a latent heat storage material.

A hydrogenated styrene-based thermoplastic elastomer (styrene-ethylene/butylene-styrene block copolymer (SEBS)) having a weight-average molecular weight of 100,000 was used as a fixing agent. The styrene content in SEBS was 30% by mass.

SEBS (15 parts) described above was added to the latent heat storage material (100 parts), followed by melt mixing in a kneader at 100° C. to 130° C. Thus, a mixture (heat storage material composition) of the fixing agent and the latent heat storage material was prepared.

A low-density wooden fiber board (insulation board) having a thickness of 10 mm or 8.5 mm was used as the substrate. The density of the insulation board was 0.29 g/cm³ before incising and impregnation with the heat storage material composition described below. The surface of the substrate was flat; however, a pattern comprising a plurality of holes was formed on the surface by incising as described below.

6.1. Incising

As shown in FIG. 7, the incising cutter 70 used in this Example has a roll-shaped body 71 and a plurality of pusher blades 72 that are arranged so as to protrude from the circumferential surface of the body 71. On the circumferential surface of the roll-shaped body 71, groups of such plurality of pusher blades 72 were formed at equal intervals along the circumferential direction of the body 71 so that they were disposed at equal intervals along the axial direction of the body 71. The cross-sectional shape of each pusher blade 72 in the circumferential direction is roughly a semi-ellipse that is formed by cutting an ellipse along the short axis direction. Accordingly, it becomes possible to easily push and pull the apex of each pusher blade 72 into and out of the porous substrate during hole formation.

In the incising step, firstly, the incising cutter 70 was rotated around its axis while the incising cutter 70 was pressed against the surface $S_1$, which was one main face of the substrate 100 used as the insulation board. With this operation, the pusher blades 72 were sequentially pushed into the surface $S_1$ of the substrate 100 and then sequentially pulled out therefrom. The surface $S_1$ of the substrate 100 into which the pusher blades 72 had been pushed was incised and the pusher blade 72 expanded the incisions. Thus, holes 101 were formed. In the case in which holes 101 were intended to be formed on both sides of the substrate 100, a plurality of holes 101 were formed on the surface $S_2$, which was another main face of the substrate 100, using the same procedure.

The pattern of a plurality of holes 101 formed on the surface of the substrate 100 is explained based on FIGS. 8-1 and 8-2. In FIG. 8-1, each hole 101 indicated by a solid line is a hole formed on the surface $S_1$ of the substrate 100, and each hole 101 indicated by a dotted line is a hole formed on the surface $S_2$ of the substrate 100. The opening of each hole 101 on either surface $S_1$ or $S_2$ of the substrate 100 has a rectangular shape with a width $D_1$ of 1 mm and a length $D_2$ of 5 mm. Each hole 101 is a bottomed hole having lateral faces and a bottom face formed with two lateral faces each having an approximately semi-elliptical shape and faces joining the two lateral faces, such hole having a depth $D_3$ of 6 mm. The two lateral faces each having an approximately semi-elliptical shape were formed so that the side of each semi-ellipse corresponding to the short axis of an ellipse was disposed on the surface of the substrate 100. Therefore, the two lateral walls are brought close to each other toward the bottom so as to be joined at the bottom, corresponding to the longitudinal axial end of an ellipse. A plurality of lines, on each of which a plurality of holes 101 were arranged in a straight line along the longitudinal direction of the opening of each hole at a $P_2$ pitch (that is, the pitch in the longitudinal direction), were formed. In addition, the plurality of lines were formed in parallel in the width direction of the opening of each hole at a $P_1$ pitch (that is, the pitch in the width direction). At such time, $P_2$ was 13 mm, and $P_1$ was 17 mm. In this Example, the opening area of each hole 101 was 5 mm², and the number of holes 101 per unit area for an area in which a plurality of holes 101 were formed on the surface $S_1$ or on the surfaces $S_1$ and $S_2$ of the substrate 100 was 4525 holes/m².

In the case in which a plurality of holes 101 were intended to be formed on both surfaces $S_1$ and $S_2$ of the substrate 100, in a projection image in which all holes 101 formed on the both surfaces were projected in the thickness direction of the substrate 100, a single line formed on the surface $S_2$ including a plurality of holes 101 arranged along the longitudinal direction of each opening was formed between two adjacent lines formed on the surface $S_1$ each including a plurality of holes 101 arranged along the longitudinal direction of each opening. That is, in the projection image, each line including a plurality of holes 101 was arranged at a $P_3$ pitch. At such time, $P_3$ was set at 8.5 mm.

Using the above procedure, a substrate in which a plurality of holes 101 were formed exclusively on a main surface, $S_1$, (that is, one incised face) and a substrate in which a plurality of holes 101 were formed on both of the two main suefeces, $S_1$ and $S_2$, (that is, both incised faces) were prepared. In addition, a substrate without incising (that is, no incising was performed) was used for comparison.

6.2. Impregnation of the Substrate with the Heat Storage Material Composition

Each of the two different heat storage material compositions (each containing a heat storage material having a melting point of 18° C. or 28° C.) were heat-melted in a vat at 115° C. to 120° C. A substrate (size: 200 mm×200 mm) was immersed in each obtained liquid melt so that the substrate was impregnated with the molten mixture. The immersion time was set to 5 minutes, 10 minutes, or 20 minutes. After the elapse of a certain period of time for immersion, the substrate was removed from the vat. The substrate was tilted to drain the remaining liquid melt that had not been retained in the substrate. Further, a portion of the liquid melt that was still remaining over the panel surface was scraped using a scraper.

The weight of the substrate was determined before and after the impregnation operation so as to calculate the impregnation rate. Note that the expression "board weight after impregnation" means the weight of the heat reservoir including the substrate and the heat storage material composition with which the substrate has been impregnated, and the expression "board weight before impregnation" means the weight of the substrate before impregnation.

Impregnation rate=(board weight after impregnation−board weight before impregnation)/(board weight before impregnation)×100(%)

6.3. Results

Table 7 lists the results.

As shown in Table 7, when the substrate prepared without incising was used, the immersion time required to achieve a rate of impregnation of the heat reservoir with the heat storage material composition of 175% or greater was 20 minutes or more.

When the substrate prepared with incising only on one face was used, immersion for 10 minutes brought the rate of impregnation of the heat reservoir with the heat storage material composition to 175% or greater depending on conditions.

When the substrate prepared with incising on both faces was used, immersion for 10 minutes brought the rate of impregnation of the heat reservoir with the heat storage material composition to 178% or greater.

As described above, by forming a pattern comprising a plurality of holes 101 on at least one main face and preferably on both main faces of the substrate, it was possible to improve performance of impregnation of the substrate with the heat storage material composition.

INDUSTRIAL APPLICABILITY

When the heat reservoir of the present invention is used alone or in combination with other materials as a material constituting a part or parts of a building, such as floors, ceilings, roofs, interior walls, and outer walls, it is possible to impart heat storage ability to such part or parts. That is, the heat reservoir of the present invention is an industrially applicable building material.

All publications, patents, and patent applications cited herein are incorporated herein by reference in their entirety.

The invention claimed is:
1. A heat reservoir, comprising:
a porous substrate being a wooden molded article formed from wooden fibers or wooden pieces; and
a heat storage material composition;
wherein:
the porous substrate is impregnated with the heat storage material composition;
the heat storage material composition comprises a latent heat storage material and a hydrogenated styrene-based thermoplastic elastomer;
the porous substrate has a surface having a plurality of holes formed thereon;
each of the holes has an opening at the surface of the porous substrate;

TABLE 7

| | | Impregnation rate (%) | | | |
| --- | --- | --- | --- | --- | --- |
| | | Substrate thickness: 10 mm Melting point of heat storage material | | Substrate thickness: 8.5 mm Melting point of heat storage material | |
| Incising work | Impregnation time (minute) | 18° C. | 28° C. | 18° C. | 28° C. |
| No incising | 5 | 117 | 100 | 134 | 115 |
| | 10 | 147 | 126 | 171 | 143 |
| | 20 | 183 | 169 | 191 | 180 |
| Incising of one face | 5 | 136 | 121 | 158 | 131 |
| | 10 | 176 | 158 | 189 | 176 |
| | 20 | 189 | 188 | 191 | 188 |
| Incising of both faces | 5 | 153 | 148 | 150 | 138 |
| | 10 | 194 | 182 | 189 | 178 |
| | 20 | 190 | 181 | 185 | 184 | a greatest dimension of each of the openings is 2 to 20 mm;

each of the openings has an area of 2 mm² or greater;

each of the holes is a bottomed hole that extends in a direction perpendicular to the surface or a through-hole that extends in a direction perpendicular to the surface and completely penetrates the porous substrate; and a weight-average molecular weight of the hydrogenated styrene-based thermoplastic elastomer and an amount of the hydrogenated styrene-based thermoplastic elastomer are related such that, when the weight-average molecular weight of the hydrogenated styrene-based thermoplastic elastomer is given by $X \times 10^4$ and the amount of the hydrogenated styrene-based thermoplastic elastomer is given by Y parts by mass relative to 100 parts by mass of the latent heat storage material in the heat storage material composition, X and Y are defined as follows:

$5 \leq X \leq 17$;

$5 \leq Y \leq 25$;

when $5 \leq X < 10$, $-2X+25 \leq Y \leq 25$; and when $14 < X \leq 17$, $5 \leq Y \leq -5X+90$.

2. The heat reservoir according to claim 1, wherein the heat storage material composition has viscosity of 500 mPa·s or less at 100° C. when measured with a B-type viscometer.

3. The heat reservoir according to claim 1, wherein $7.5 \leq X \leq 15$.

4. The heat reservoir according to claim 2, wherein $7.5 \leq X \leq 15$.

5. The heat reservoir according to claim 1, wherein X and Y are defined as follows:

when $5 \leq X < 10$, $-2X+30 \leq Y \leq -X+30$;

when $10 \leq X < 14$, $-(5/7)X+(120/7) \leq Y \leq -1.25X+32.5$; and when $14 \leq X \leq 17$, $-(5/7)X+(120/7) \leq Y \leq -(10/3)X+(185/3)$.

6. The heat reservoir according to claim 2, wherein X and Y are defined as follows:

when $5 \leq X < 10$, $-2X+30 \leq Y \leq -X+30$;

when $10 \leq X < 14$, $-(5/7)X+(120/7) \leq Y \leq -1.25X+32.5$; and when $14 \leq X \leq 17$, $-(5/7)X+(120/7) \leq Y \leq -(10/3)X+(185/3)$.

7. The heat reservoir according to claim 3, wherein X and Y are defined as follows:

when $5 \leq X < 10$, $-2X+30 \leq Y \leq -X+30$;

when $10 \leq X < 14$, $-(5/7)X+(120/7) \leq Y \leq -1.25X+32.5$; and when $14 \leq X \leq 17$, $-(5/7)X+(120/7) \leq Y \leq -(10/3)X+(185/3)$.

8. A method for producing the heat reservoir according to claim 1, comprising:

melting the heat storage material composition; and impregnating the porous substrate with the molten heat storage material composition.

9. The method according to claim 8, wherein the heat storage material composition has a viscosity of 500 mPa·s or less at 100° C. when measured with a B-type viscometer.

10. The method according to claim 8, wherein $7.5 \leq X \leq 15$.

11. The method according to claim 9, wherein $7.5 \leq X \leq 15$.

12. The method according to claim 8, wherein X and Y are defined as follows:

when $5 \leq X < 10$, $-2X+30 \leq Y \leq -X+30$;

when $10 \leq X < 14$, $-(5/7)X+(120/7) \leq Y \leq -1.25X+32.5$; and when $14 \leq X \leq 17$, $-(5/7)X+(120/7) \leq Y \leq -(10/3)X+(185/3)$.

13. The method according to claim 9, wherein X and Y are defined as follows:

when $5 \leq X < 10$, $-2X+30 \leq Y \leq -X+30$;

when $10 \leq X < 14$, $-(5/7)X+(120/7) \leq Y \leq -1.25X+32.5$; and when $14 \leq X \leq 17$, $-(5/7)X+(120/7) \leq Y \leq -(10/3)X+(185/3)$.

14. The method according to claim 10, wherein X and Y are defined as follows:

when $5 \leq X < 10$, $-2X+30 \leq Y \leq -X+30$;

when $10 \leq X < 14$, $-(5/7)X+(120/7) \leq Y \leq -1.25X+32.5$; and when $14 \leq X \leq 17$, $-(5/7)X+(120/7) \leq Y \leq -(10/3)X+(185/3)$.

\* \* \* \* \*